US011438237B1

(12) United States Patent
Subramanian et al.

(10) Patent No.: US 11,438,237 B1
(45) Date of Patent: Sep. 6, 2022

(54) SYSTEMS AND METHODS FOR DETERMINING PHYSICAL LINKS BETWEEN NETWORK DEVICES

(71) Applicant: VMware, Inc., Palo Alto, CA (US)

(72) Inventors: Giri Prashanth Subramanian, Sunnyvale, CA (US); Sajid Awan, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 82 days.

(21) Appl. No.: 16/748,655

(22) Filed: Jan. 21, 2020

(51) Int. Cl.
*H04L 41/12* (2022.01)
*H04L 47/2483* (2022.01)
*H04L 12/46* (2006.01)

(52) U.S. Cl.
CPC .......... *H04L 41/12* (2013.01); *H04L 12/4641* (2013.01); *H04L 47/2483* (2013.01)

(58) Field of Classification Search
CPC .. H04L 41/12; H04L 12/4641; H04L 47/2483
See application file for complete search history.

(56) References Cited

U.S. PATENT DOCUMENTS

| | | | | |
|---|---|---|---|---|
| 6,944,127 B1 * | 9/2005 | Burchfiel | ................ | H04L 12/64 370/428 |
| 7,940,685 B1 * | 5/2011 | Breslau | ............... | H04L 43/0858 709/224 |
| 8,976,792 B2 * | 3/2015 | Patel | ...................... | H04L 45/64 370/392 |
| 9,225,601 B2 | 12/2015 | Khurshid et al. | | |
| 10,776,965 B2 * | 9/2020 | Stetson | ................. | G06F 16/904 |
| 2012/0127854 A1 * | 5/2012 | Khetan | ................... | H04L 45/00 370/218 |
| 2018/0287912 A1 * | 10/2018 | Zabarsky | ............. | G06F 3/0635 |

OTHER PUBLICATIONS

Khurshid et al. "VeriFlow: Verifying Network-Wide Invariants in Real Time", 10th USENIX Symposium on Networked Systems Design and Implementation (NSDI 13), 2013, pp. 15-27 (13 pages).
U.S. Appl. No. 15/683,650, filed Aug. 22, 2017.
U.S. Appl. No. 16/041,598, filed Jul. 20, 2018.

* cited by examiner

*Primary Examiner* — Sm A Rahman
(74) *Attorney, Agent, or Firm* — Kim & Stewart LLP

(57) ABSTRACT

Physical communication links are determined between devices in a network of devices without human input. A network topology engine determines the physical communication links between devices in the network and constructs a network topology based on the determined physical communication links. The network topology engine infers the presence of each physical communication link from network traffic that is currently flowing in the network. The network topology engine collects reachability information from the network devices included in the network that are already stored by the network devices, such as device identification entries included in address resolution protocol tables and media access control address tables. The network topology engine populates a flow graph of potential physical links between network interfaces that is weighted based on the collected reachability. The network topology engine then selects the highest weighted potential physical links between network interfaces to be the actual physical links of the network.

20 Claims, 22 Drawing Sheets

410

| VLAN 411 | MAC Address 412 | Port 413 |
|---|---|---|
| 1 | 0001.c7ad.e316 | Fao/1 |
| 1 | 0002.4ab7.1702 | Fao/2 |
| 1 | 0001.c54c.f233 | Fao/3 |
| 1 | 0001.a67a.b371 | Fao/4 |
| 2 | 0001.c7ad.e316 | Fao/11 |
| 2 | 000d.bd94.6b58 | Fao/12 |
| 2 | 0061.3e5c.ba1d | Fao/13 |
| 2 | 00c0.f934.3ec4 | Fao/14 |
| 3 | 0001.c66d.613c | Fao/21 |
| 3 | 0056.bf22.6b55 | Fao/22 |
| 3 | 0001.c7ad.e316 | Fao/24 |
| ... | ... | ... |

| Internet Address 421 | MAC Address 422 | VLAN 423 | Interface ID 424 |
|---|---|---|---|
| 192.168.0.6 | 0001.c7ad.e316 | 1 | eth0 |
| 192.168.0.7 | 0002.4ab7.1702 | 1 | eth1 |
| 192.168.0.9 | 0001.c54c.f233 | 1 | eth2 |
| 225.0.5.0 | 0001.a67a.b371 | 1 | eth3 |
| 225.0.5.151 | 0001.ddad.3377 | 2 | eth4 |
| 225.0.5.75 | 000d.bd94.6b58 | 2 | eth5 |
| 225.0.5.76 | 0061.3e5c.ba1d | 2 | eth6 |
| ⋮ | ⋮ | ⋮ | ⋮ |

| Interface ID 431 | MAC Address 432 | VLAN ID 433 |
|---|---|---|
| eth0 | 0001.c7ad.e316 | 1 |
| eth1 | 0002.4ab7.1702 | 1 |
| eth2 | 0001.c54c.f233 | 1 |
| eth3 | 0001.a67a.b371 | 1 |
| eth4 | 0001.ddad.3377 | 2 |
| eth5 | 000d.bd94.6b58 | 2 |
| eth6 | 0061.3e5c.ba1d | 2 |
| ⋮ | ⋮ | ⋮ |

| Flow ID 601 | Residing Device 602 | Interface 603 | Termination Indicator 604 |
|---|---|---|---|
| F1 (=331) | D1 | MAC311 | N |
| F2 (= 321) | D1 | MAC311 | N |
| F1 | D2 | MAC322 | N |
| F2 | D2 | MAC321 | Y |
| F1 | D3 | MAC331 | Y |
| ⋮ | ⋮ | ⋮ | ⋮ |

| IP Address Range 1601 | Interface For Routing Traffic |
|---|---|
| 10.0.0.0/24 | 1511 |
| 20.0.0.0/24 | 1512 |
| 30.0.0.0/24 | 1513 |
| 40.0.0.0/24 | 1514 |

| IP Address Range 1701 | Interface For Routing Traffic |
|---|---|
| 20.0.0.0/24 | 1521 |
| 30.0.0.0/24 | 1521 |
| 40.0.0.0/24 | 1521 |
| 0.0.0.0/24 | 1522 |

FIG. 17

| IP Address Range 1801 | Interface For Routing Traffic |
|---|---|
| 20.0.0.0/24 | 1531 |
| 30.0.0.0/24 | 1531 |
| 40.0.0.0/24 | 1531 |

SYSTEMS AND METHODS FOR DETERMINING PHYSICAL LINKS BETWEEN NETWORK DEVICES

BACKGROUND

The present disclosure relates to the field of data networks, and, more specifically, to systems and methods for determining physical link between network devices in a data network.

Computer networks are essential for the day-to-day operations of many organizations, including business enterprises, government entities, network service providers, online streaming services, and the like. For example, such organizations rely on computer networks for storing and retrieving data, enabling communication between employees, and providing services to customers.

However, as the complexity and scale of modern computer networks has increased, the development of tools to manage their operation has not kept pace. As a result, network administrators typically find and diagnose problems by employing manual procedures, such as manually drafted network diagrams, which can be time-consuming to generate and unreliable. For example, accurate knowledge of the topology of the physical communication links between network devices is critical for proper operation and troubleshooting of a computer network. But without accurate and automated processes for determining such topology, the simple swapping of two network cables that are connected to a router or switch can result in serious network problems that are very difficult to solve.

One automated approach for determining network topology involves collecting neighborhood information directly from network devices and using that information to build a network topology in an automated fashion. Routers, switches, and other network devices gather neighborhood information by running vendor-agnostic neighborship protocols, such as Link Layer Discovery protocol (LLDP), or proprietary protocols, such as the Cisco Discovery Protocol (CDP). However, such neighborship protocols have known security vulnerabilities, and are often proscribed. In addition, network operators tend to shut down such protocols on certain devices due to the security implications. Further, many types of devices, such as Cisco ASA firewalls, do not even support such protocols. Consequently, neighborship protocols are not a reliable approach for generating the topology of the network.

SUMMARY

One or more embodiments provide systems and methods for determining physical communication links between devices in a network of devices without human input. Specifically, according to the embodiments, a network topology engine determines the physical communication links between devices in the network and constructs a network topology based on the determined physical communication links. The network topology engine infers the presence of each physical communication link from network traffic that is currently flowing in the network. In contrast to network monitoring tools, the network topology engine does not directly monitor network traffic, for example via one or more agents residing at various locations within the network. Instead, the network topology engine collects reachability information from the network devices included in the network that are already stored by the network devices, such as device identification entries included in address resolution protocol (ARP) tables and media access control (MAC) address tables. The network topology engine populates a flow graph of potential physical links between network interfaces that is weighted based on the collected reachability. The network topology engine then selects the highest weighted potential physical links between network interfaces to be the actual physical links of the network.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIGS. 4A-4C schematically illustrate reachability information stored by network devices of the data communication network of FIG. 2, according to an embodiment.

FIG. 6 illustrates an address location hash map of flow identifiers for a portion of a data communication network, according to an embodiment.

FIG. 16 is a schematic illustration of a routing table of the customer edge device of FIG. 15, according to an embodiment.

FIG. 17 is a schematic illustration of a routing table of the provider edge device of FIG. 15, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

Topology Inference

Figure 1:
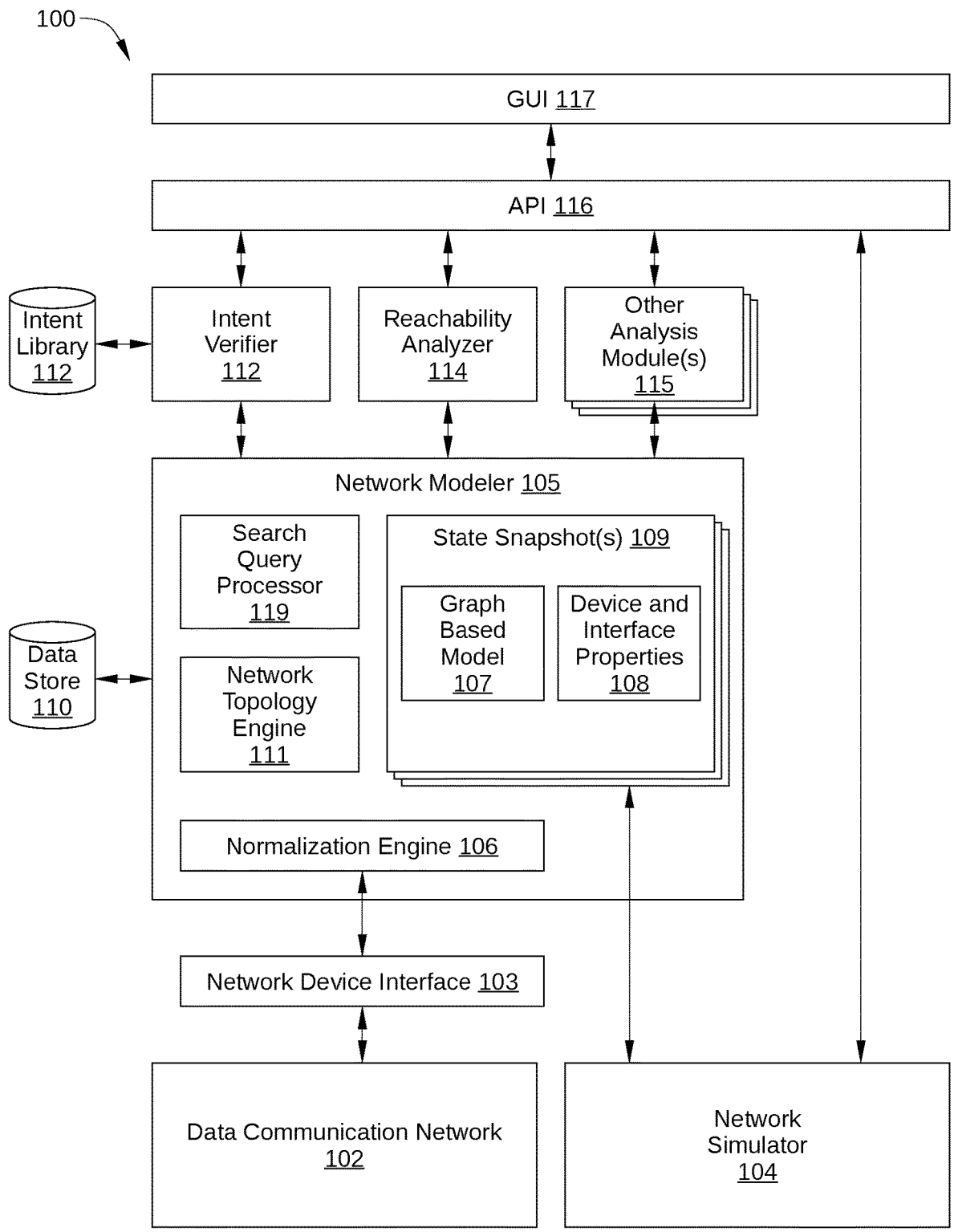
FIG. 1 illustrates a network topology inference system for modeling and analyzing a data communication network, according to various embodiments.

FIG. 1 illustrates a network topology inference system 100 for modeling and analyzing a data communication network 102, according to various embodiments. In some embodiments, network topology inference system 100 collects network state information directly from network devices of data communication network 102 and constructs a functional model of data communication network 102. The functional model is based on a physical network topology describing what network devices are coupled to each other via a physical communication link, such as a wired connection. According to various embodiments, network topology inference system 100 infers the presence of each physical communication link between network devices based on network traffic that is currently flowing in the network.

In some embodiments, network topology inference system 100 is further configured as a network verification system. In such embodiments, network topology inference system 100 is further configured to model the results of policy verifications that can be used to (a) configure or reconfigure devices within the network to eliminate the violation, (b) trigger an alert on an external network management or security monitoring system, (c) visually illustrate problems in the network to users of the system, and/or (d) trigger an automated change to configurations or block such a change if policy verifications pass or fail. An example of a network verification system is described in U.S. Pat. No. 9,225,601, entitled "Network-Wide Verification of Invariants," the entire content of which is hereby incorporated by reference.

Network topology inference system 100 is communicatively coupled to network 102, which includes a plurality of network devices (not shown), such as firewalls, routers, switches, virtual switches, etc., via a network device interface 103. Device state information for the plurality of network devices is extracted and sent to a network modeler 105. In addition, in some embodiments, a network simulator 104 produces hypothetical device state information, which is also sent to network modeler 105. In such embodiments, the hypothetical device state information can simulate the effect of a configuration change prior to deployment. Network modeler 105 normalizes input via a normalization engine 106 to produce a single format across a plurality of network device types or manufacturers. In addition, network modeler 105 produces one or more (real or hypothetical) snapshots 109 of data communication network 102 that can include a graph-based model 107 of potential data flow behavior and/or a variety of attributes or properties of devices and interfaces or other objects in data communication network 102. Network topology inference system 100 may store a multiplicity of snapshots 109, in memory and/or mass storage, such as in data store 110. Network topology inference system 100 also includes a search query processor 111 to query a network model of data communication network 102 to obtain objects and data flow behavior. Network topology inference system 100 may also include higher-level analysis modules for querying a particular network model, such as an intent verifier 112 to verify whether network intent matches that of the particular network model, drawing on intent rules built from an intent library 113; a reachability analyzer 114; and potentially other analysis modules 115. The functionality of the verification and analysis models, network modeler 105, and network simulator 104 may be available via an application programming interface (API) 116, which programs and scripts can access directly, and on which a graphical user interface 117 can be built.

Figure 2:
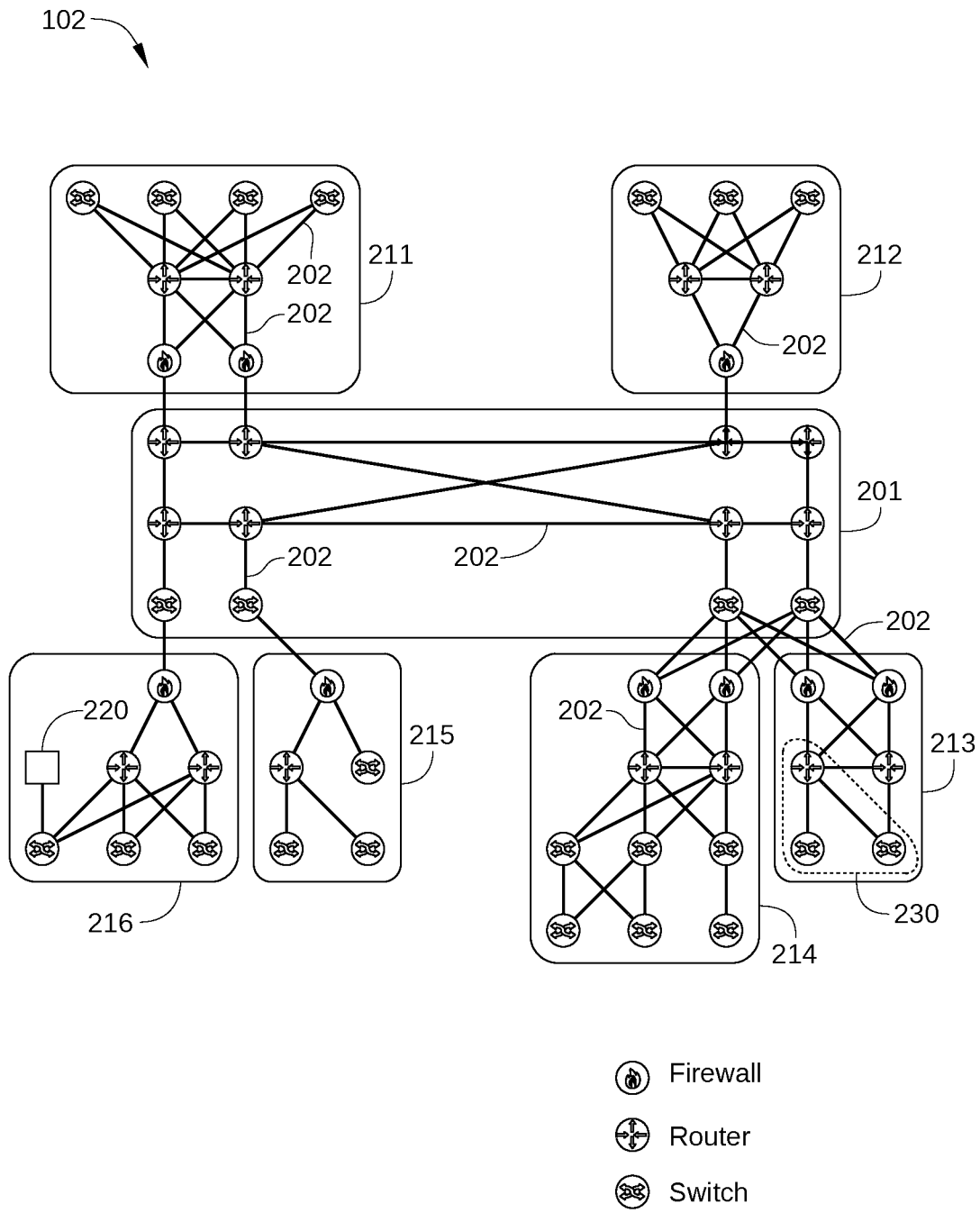
FIG. 2 is a schematic illustration of the data communication network that is coupled to the network topology inference system of FIG. 1, according to an embodiment.

FIG. 2 is a schematic illustration of data communication network 102, according to an embodiment. Data communication network 102 is a computer network that is communicatively coupled to network topology inference system 100 and includes one or more network devices, such as firewalls, routers, switches, and the like, and a plurality of host devices, such as desktop computers, servers, and the like. In the embodiment illustrated in FIG. 2, data communication network 102 is configured with a backbone 201 and subnets 211-215. Backbone 201 and subnets 211-215 each include one or more firewalls, routers, and/or switches, and a plurality of host devices. For clarity, the plurality of host devices of data communication network 102 are not shown in FIG. 2, with the exception of an edge host 220 in which, in some embodiments, network topology inference system 100 resides or is executed. As shown, the firewalls, routers, switches, host devices of data communication network 102 are communicatively coupled by physical communication links, such as wired connections 202. Wired connections 202 between network devices of data communication network 102 are described in greater detail below in conjunction with FIG. 3.

Figure 3:
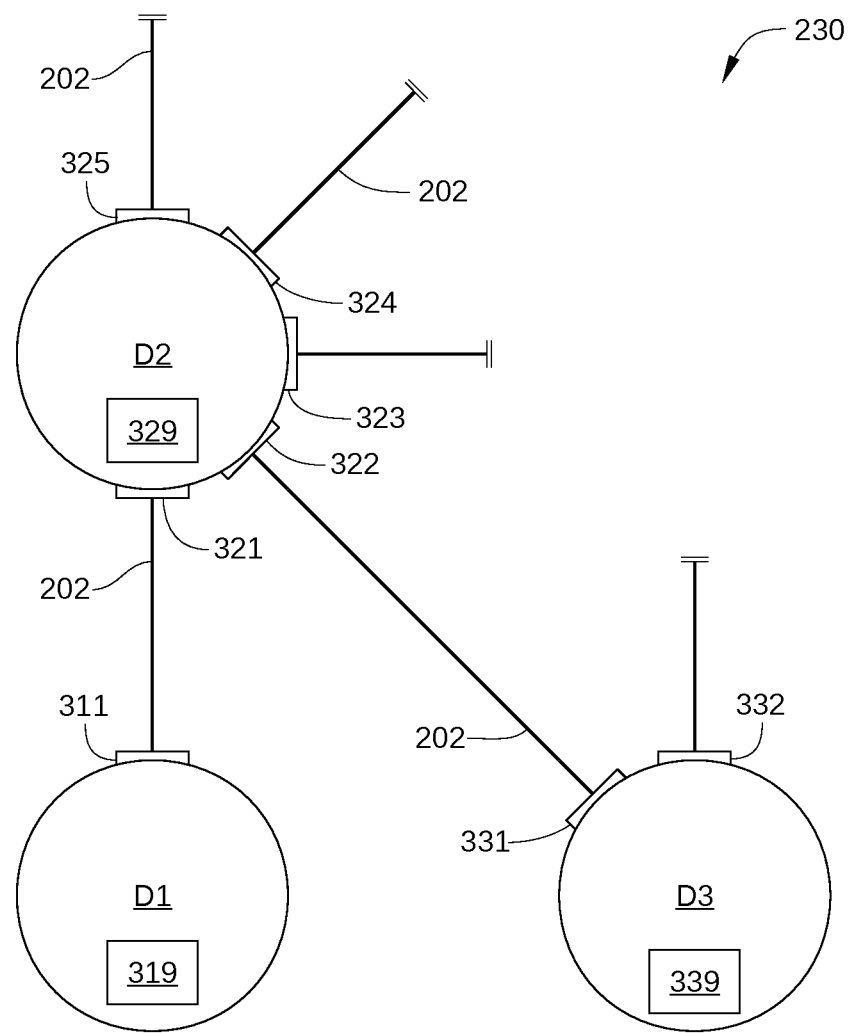
FIG. 3 is a schematic illustration of a portion of a subnet included in the data communication network of FIG. 2, according to an embodiment.

FIG. 3 is a schematic illustration of a portion 230 of subnet 213, according to an embodiment. Portion 230 includes three network devices D1-D3. Each of network devices D1-D3 can be any technically feasible network device configured to enable communication and interaction between devices on data communication network 102. Examples of such network devices include firewalls, routers, switches, and the like.

Network devices D1-D3 are connected by physical communication links 202, where a given communication link 202 is physically coupled to a particular network device at a single interface. As shown, network device D1 includes a single such network interface 311 that is in use, network device D2 includes a plurality of such network interfaces 321-325, and network device D3 includes two such network interfaces 331 and 332.

Having an up-to-date topology of wired connections 202 of data communication network 102 greatly facilitates proper management and operation of data communication network 102, particularly as the physical make-up of data communication network 102 changes over time. While the topology of portion 230 is clearly shown in FIG. 3, the ability for a network administrator to capture such topology and to detect changes in such topology is limited. For example, network administrators often rely on manually generated drawings, which are prone to human error, or neighborship protocols, which can be shut down by other network operators and/or are not supported by each and every network device in data communication network 102. As a result, the network topology available to a network administrator can often be outdated or otherwise inaccurate, making debugging networking issues much more difficult and time-consuming. According to various embodiments, the current topology of wired connections between the network devices of data communication network 102 are determined without human input. Specifically, network topology engine 111 of FIG. 1 is configured to determine the current topology of wired connections based on reachability information included in each network device of data communications network 102. In the embodiment illustrated in FIG. 3, network device D1 stores or otherwise includes reachability information 319, network device D2 stores or otherwise includes reachability information 329, and network device D3 stores or otherwise includes reachability information 339. Alternatively or additionally, in some embodiments, reachability information 319, reachability information 329, and reachability information 339 can reside elsewhere in data communication network 102. Embodiments of such reachability information are described below in conjunction with FIGS. 4A-4C.

FIGS. 4A-4C schematically illustrate reachability information stored by network devices of data communication network 102, according to an embodiment. In some embodiments, reachability information for a particular network device includes a media access control (MAC) address table 410 for that particular network device; in some embodiments, reachability information for a particular network device includes an address resolution protocol (ARP) table 420 for that particular network device; and, in some embodiments, reachability information for a particular network device includes interface configuration information for that particular network device, such as a configuration information mapping 430 of a MAC addresses and/or VLAN identifiers that are associated with each interface of that particular network device.

As shown in FIG. 4A, MAC address table 410 for a particular network device includes a plurality of MAC address values 412 and, for each MAC address value 412, a port ID 413. Each different MAC address value 412 represents identifying information for a different interface in data communication network 102 to which data traffic has been sent from the particular network device. The corresponding port ID 413 indicates the specific interface of the particular network device through which the data traffic has been sent from the particular network device. In some embodiments, MAC address table 410 for a particular network device also includes, for each MAC address value 412, a virtual local area network (VLAN) ID 411 that is also associated with the MAC address value 412. Thus, by examining the contents of MAC address table 410 for a particular network device, destination MAC addresses for data traffic that has passed through that particular network device can be identified. In addition, the interface included in that particular network device through which data traffic is sent to the destination MAC address can also be identified.

As shown in FIG. 4B, ARP table 420 for a particular network device includes a plurality of Internet address values 421, MAC address values 422, VLAN IDs 423, and interface (or port) IDs 424. As shown, ARP table 420 maps IP addresses of certain network devices of data communication network 102 to the MAC addresses of those network devices. In operation, ARP table 420 is used to determine the destination MAC addresses of those network devices, as well as the VLANs and interfaces (or "ports") of the particular network device from which those network devices are reached. Thus, in ARP table 420 for a particular network device, each Internet address value 421 references a destination network device to which data traffic has been sent from the particular network device, and the corresponding MAC address value 422 is the MAC address of the destination network device. Further, the corresponding VLAN ID 423 indicates the VLAN of the destination network device and the interface ID 424 indicates the specific interface from which the destination network device is reached.

As shown in FIG. 4C, configuration information mapping 430 includes interface configuration information for a particular network device of data communication network 102. For example, in the embodiment illustrated in FIG. 4C, configuration information mapping 430 for a particular network device includes a plurality of interface IDs 431, MAC addresses 432, and VLAN IDs 433. Each interface ID 431 indicates a specific interface for the particular network device, each MAC address 432 is the MAC address of a destination network device that is reached via the corresponding interface of the particular network device, and each VLAN ID 433 indicates the VLAN of the destination network device. Thus, configuration information mapping 430 maps MAC address information and VLAN information to a specific interface of the particular network device.

In some embodiments, configuration information mapping 430 includes additional and/or alternative interface configuration information for the particular network device. For example, in some embodiments, configuration information mapping 430 includes entries that map tunnel interfaces to a specific interface of the particular network device, sub-interfaces to a specific interface of the particular network device, and/or entries that map port-channel interfaces to a specific interface of the particular network device.

In some embodiments, the reachability information included in a network device is a MAC address table 410, in some embodiments the reachability information included in a network device is an ARP table 420, in some embodiments the reachability information included in a network device is a configuration information mapping 430, and in some embodiments the reachability information included in a network device is a combination of a MAC address table 410, an ARP table 420, and/or a configuration information mapping 430. For example, in an embodiment in which a network device is a layer 2 (L2) switch, the reachability information for the network device generally includes a MAC address table 410. In an embodiment in which a network device is a layer 3 (L3) router, the reachability information for the network device generally includes an ARP table 420.

According to various embodiments, a network topology inference system, such as network topology inference system 100 of FIG. 1, determines the topology of physical communication links between devices in a network based on the above-described reachability information. One such embodiment is described below in conjunction with FIG. 5.

Figure 5:
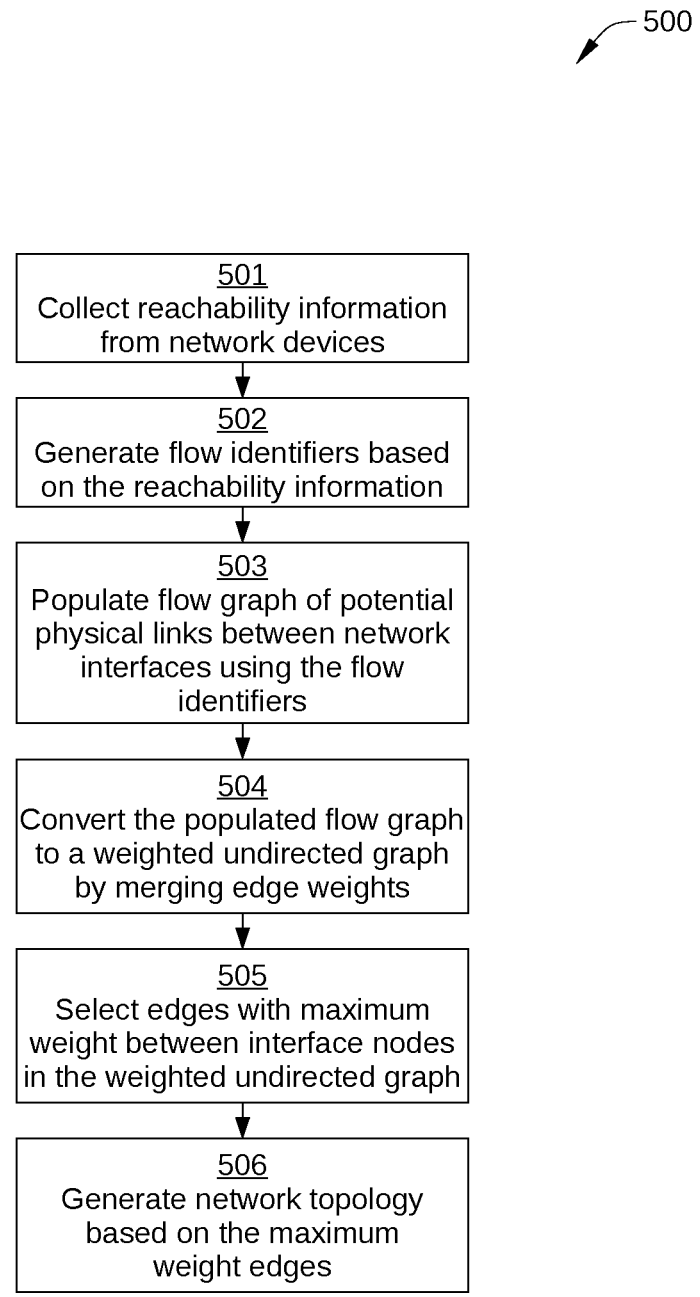
FIG. 5 sets forth a flowchart of method steps for inferring physical communication links in a data communication network, according to an embodiment.

FIG. 5 sets forth a flowchart of method steps for inferring physical communication links in a data communication network, according to an embodiment. Although the method steps are described in conjunction with network topology inference system 100 of FIGS. 1-4C, persons skilled in the art will understand that the method steps may be performed with other types of systems.

A method 500 begins at step 501, when network modeler 105 collects reachability information from the network devices of data communication network 102. In some embodiments, method 500 is performed upon start up of data communication network 102. Additionally or alternatively, in some embodiments, method 500 is performed periodically. Additionally or alternatively, in some embodiments, method 500 is performed in response to a specified user input.

It is noted that the reachability information stored in the network devices of data communication network 102 reflect recent data traffic that has occurred in data communication network 102. Consequently, a network topology that is generated based on such reachability information will represent the current physical configuration of data communication network 102.

In step 502, network topology engine 111 generates flow identifiers based on the reachability information collected in step 501. That is, a set of flow identifiers that uniquely characterize traffic flow in data communication network 102 is generated. In some embodiments, each flow identifier in the set of flow identifiers is based on a specific destination MAC address that is collected in step 501 as the reachability information from the data communication network 102. One such embodiment is described below in conjunction with FIG. 6.

Figure 7:
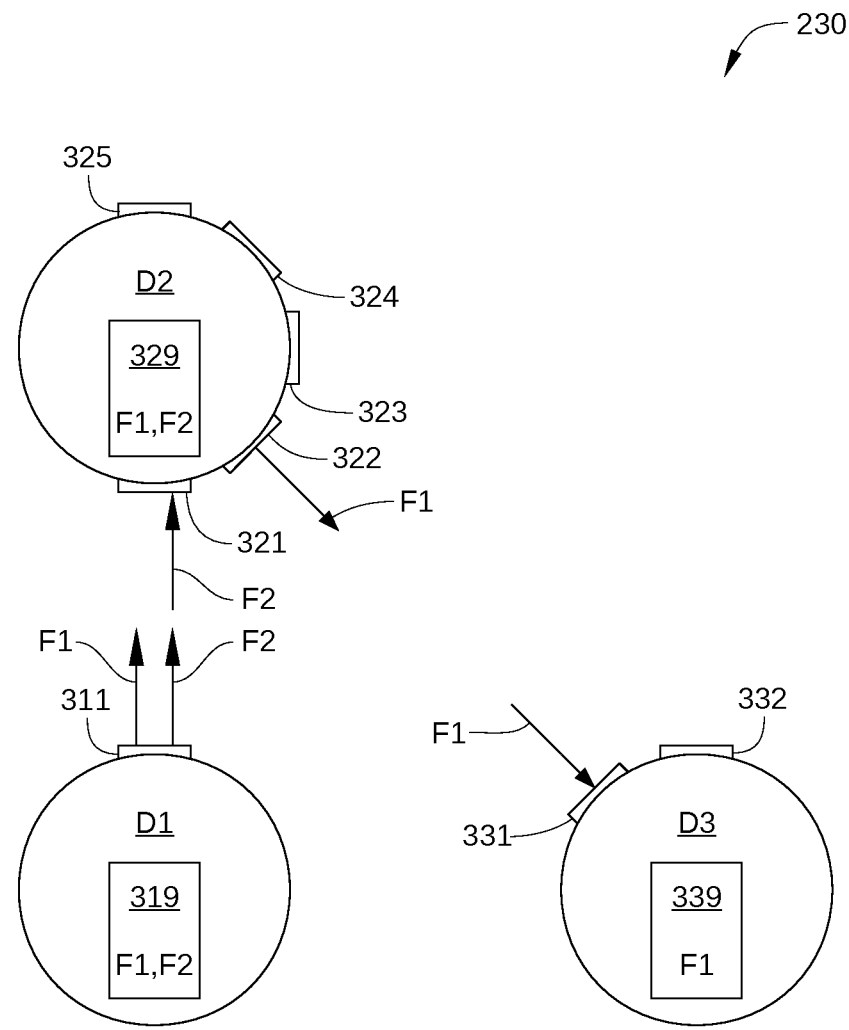
FIG. 7 schematically illustrates a portion of the subnet included in the data communication network of FIG. 2 with the known physical communication links between network devices removed and the set of flow identifiers in address location hash map shown, according to an embodiment.

FIG. 6 illustrates an address location hash map 600 of a set of flow identifiers for portion 230 of data communication network 102, according to an embodiment. Address location hash map 600 depicts flow identifiers (IDs) F1 and F2 and associated information for data traffic that flows in portion 230 of data communication network 102. FIG. 7 schematically illustrates portion 230 with the known physical communication links 202 between network devices removed and the set of flow identifiers in address location hash map 600 shown, according to an embodiment. The flow identifiers depicted in address location hash map 600 are collected for data traffic associated with network devices D1, D2, and D3 in portion 230. By way of example, in the embodiment illustrated in FIGS. 6 and 7, network devices D1 and D3 are routers with L3 interfaces, while network device D2 is a simple L2 switch with L2 interfaces. Thus, interfaces 311, 331, and 332 are L3 interfaces and interfaces 321-325 are L2 interfaces.

In the embodiment illustrated in FIG. 6, each flow identifier 601 in address location hash map 600 is based on device identification information, also referred to as reachability information, of a destination device. For example, flow ID F1 is based on, includes, and/or is equivalent to the MAC address of interface 331 of network device D3. Due to the data traffic that has occurred in portion 230, the MAC address of interface 331 resides in reachability information 319 (for example in an ARP table 420) of network device D1, reachability information 329 of network device D2 (for example in a MAC address table 410), and reachability information 339 (for example in a configuration information mapping 430) of network device D3. As a result, three instances of flow ID F1 occur in address location hash map 600 after reachability information is collected from data communication network 102 in step 501. Similarly, flow ID F2 is based on, includes, and/or is equivalent to the MAC address of interface 321 of network device D2. Thus, due to the data traffic that has occurred in portion 230, the MAC address of interface 321 resides in reachability information 319 (for example in an ARP table 420) of network device D1 and reachability information 329 (for example in a configuration information mapping 430) of network device D2. As a result, two instances of flow ID F2 occur in address location hash map 600 after reachability information is collected in step 501.

Each instance of a flow identifier 601 in address location hash map 600 is mapped to or otherwise associated with a residing network device 602 from which the MAC address is collected to generate the flow ID. Thus, because flow ID F1 is collected from network devices D1, D2, and D3, flow ID F1 is associated with three residing network devices 602 in address location hash map 600: network devices D1, D2, and D3. Similarly, because flow ID F2 is collected from network devices D1 and D2, flow ID F2 is associated with two residing network devices 602 in address location hash map 600: network devices D1 and D2.

Each flow identifier 601 in address location hash map 600 is also mapped to or otherwise associated with a particular physical interface 603 of the residing network device 602, where that particular physical interface is used to reach the destination MAC address of the destination device associated with the flow identifier 601. For example, data traffic associated with the instance of flow ID 1 residing on network device D1 ultimately reaches the destination device (interface 331 of networking device D3) via interface 311 of networking device D1. Similarly, data traffic associated with the instance of flow ID 1 residing on network device D2 reaches the destination device (interface 331 of networking device D3) via interface 322 of networking device D1.

In some embodiments, each flow identifier 601 in address location hash map 600 is also mapped to or otherwise associated with a termination indicator 604. The termination indicator 604 indicates whether termination occurs of the data traffic associated with that flow identifier 601 at the physical interface 603 of the residing network device 602. When the termination indicator 604 indicates that the data traffic associated with that instance of the flow identifier 601 terminates, the data traffic is consumed at the residing network device. In some embodiments, the termination indicator 604 for an instance of a flow identifier 601 is an entry in address location hash map 600. In other embodiments, the value of termination indicator 604 is implied based on whether the instance of the flow identifier 601 is based on a MAC address collected from a configuration information mapping 430 or a MAC address collected from a MAC address table 410. Thus, in such embodiments, the source of the MAC address collected in step 501 determines an actual or implied value of the termination indicator 604.

It is noted that the actual or implied value of termination indicator 604 can be employed to facilitate inferring physical communication links between network devices D1, D2, and D3, as set forth below.

In FIG. 7, each of the flow identifiers generated in step 502 and included in address location hash map 600 is depicted as an entry included in the reachability information of one or more of network devices D1-D3 and also as a graphical indicator of traffic flow that corresponds to one such entry. Thus, a different instance of flow ID F1 is shown included in reachability information 319 of network device D1, reachability information 329 of network device D2, and reachability information 339 of network device D3. In addition, flow ID F1 is shown as a graphical indicator of traffic flow leaving interface 311, since an instance of flow ID F1 is associated with interface 311 of network device D1.

Further, flow ID F1 is also shown as a graphical indicator of traffic flow leaving interface 322, since an instance of flow ID F 1 is associated with interface 322 of network device D2. Flow ID F1 is shown a third time as a graphical indicator of traffic flow terminating at interface 331, since an instance of flow ID F1 is associated with interface 331 of network device D3 and a termination indicator 604 that indicates that data traffic associated with flow ID F1 is consumed at networking device D3.

For clarity, not all data traffic that occurs in portion 230 is represented by flow identifiers 601 in FIGS. 6 and 7. Additional data traffic not represented by flow identifiers that may be present in portion 230 may include data traffic from network device D2 to network devices outside portion 230, data traffic from network device D3 to network device D1, data traffic from network device D3 to network devices outside portion 230, and the like.

As noted above, flow identifiers 601 are based on a reachability information, such as device identification information, for a destination device. In the embodiment illustrated in FIG. 6, such reachability information for each flow identifier is the MAC address of a destination interface. In some instances of data communication network 102, basing each flow identifier on the MAC address of a particular destination device provides sufficient information for tracking data traffic throughout data communication network 102. However, MAC addresses can frequently be shared by network devices. For example, there can be multiple L2 segments in a data communication network in which hosts and/or interfaces share the same MAC address. In such instances, additional information is required to uniquely track data traffic from each network device in data communication network 102. Accordingly, in some embodiments, the reachability information on which flow identifiers 601 are based can further include VLAN ID. Thus, in such embodiments, a tuple formed by the (device name, destination MAC address, VLAN) can be used to track the flow of traffic through the network.

In some embodiments, for each device $d_I$ in data communication network 102, physical interface 603 entries in address location hash map 600 are determined using a suitable procedure. Thus, for each ARP entry $a_e$ in $d_I$, the outgoing interface in $a_e$ is resolved to the appropriate physical interfaces ($p_I$) using the procedure; for each MAC entry $m_e$ in $d_I$, the outgoing interface in $m_e$ is resolved to the appropriate physical interfaces ($p_I$) from information included in the MAC address table 410 using the procedure, and for each interface in $d_I$, the interface is resolved to its potential physical interfaces ($p_I$). One embodiment of such a procedure is described below in conjunction with FIG. 8.

Figure 8:
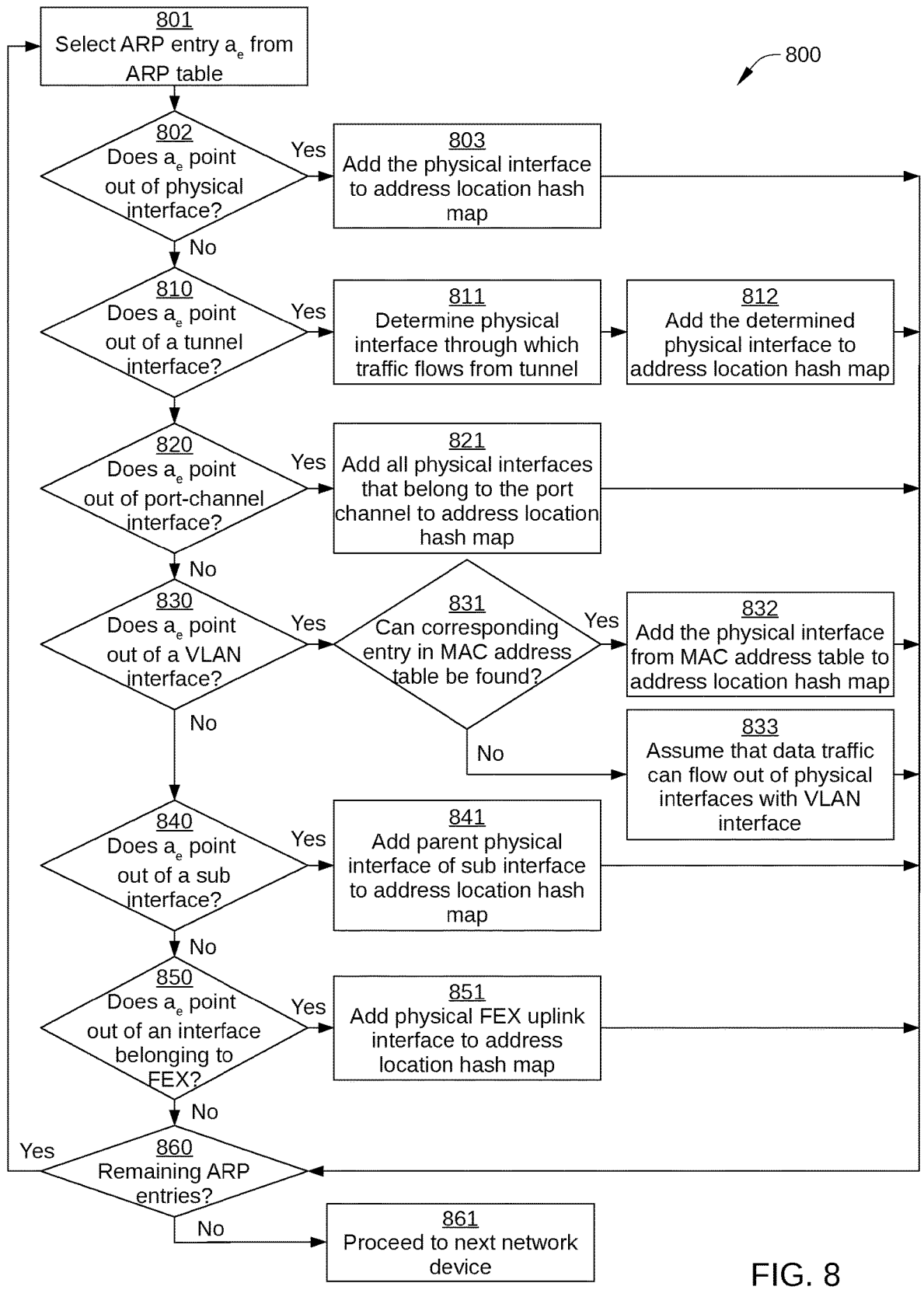
FIG. 8 sets forth a flowchart of method steps for determining entries in an address location hash map, according to an embodiment.

FIG. 8 sets forth a flowchart of method steps for determining entries in address location hash map 600, according to an embodiment. The method steps are performed for a specific network device $d_I$ in data communication network 102. To complete all entries in address location hash map 600, the method steps are performed for each network device in data communication network 102. Although the method steps are described in conjunction with network topology inference system 100 of FIG. 1-7, persons skilled in the art will understand that the method steps may be performed with other types of systems.

A method 800 begins at step 801, where network topology engine 111 selects an entry $a_e$ in ARP table 420 for the instant network device. In step 802, network topology engine 111 determines whether an ARP entry $a_e$ directly points out of physical interface $p_H$ in network device $d_I$ (where network device $d_I$ includes H physical interfaces). If yes, method 800 proceeds to step 803; if no, method 800 proceeds to step 810. In step 803, network topology engine 111 adds the physical interface $p_H$ as an entry in address location hash map 600 for ARP entry $a_e$, and method 800 proceeds to step 860.

In step 810, network topology engine 111 determines whether ARP entry $a_e$ points out of a tunnel in network device $d_I$. If yes, method 800 proceeds to step 811; if no, method 800 proceeds to step 820. In step 811, network topology engine 111 determines the physical interface that is associated with the tunnel interface and through which data traffic from the tunnel interface flows. In step 812, network topology engine 111 adds the determined physical interface as an entry in address location hash map 600 for ARP entry $a_e$, and method 800 proceeds to step 860.

In step 820, network topology engine 111 determines whether ARP entry $a_e$ points out of a port-channel interface in network device $d_I$. If yes, method 800 proceeds to step 821; if no, method 800 proceeds to step 830. In step 821, network topology engine 111 adds all physical interfaces that belong to the port channel as entries in address location hash map 600 for ARP entry $a_e$, and method 800 proceeds to step 860.

In step 830, network topology engine 111 determines whether ARP entry $a_e$ points out of a VLAN interface in network device $d_I$. If yes, method 800 proceeds to step 831; if no, method 800 proceeds to step 840. In step 831, network topology engine 111 determines whether the corresponding entry can be found in address table 410 for network device $d_I$. If yes, method 800 proceeds to step 832; if no, method 800 proceeds to step 833. In step 832, network topology engine 111 adds the physical interface from MAC address table 410 as an entry in address location hash map 600 for ARP entry $a_e$, and method 800 proceeds to step 860. In step 833, network topology engine 111 assumes that data traffic associated with ARP entry $a_e$ can flow out of all physical interfaces of network device $d_I$, and adds all physical interfaces having that VLAN interface that belong to network device $d_I$ as entries in address location hash map 600 for ARP entry $a_e$. Method 800 then proceeds to step 860.

In step 840, network topology engine 111 determines whether ARP entry $a_e$ points out of a sub-interface in network device $d_I$. If yes, method 800 proceeds to step 841; if no, method 800 proceeds to step 850. In step 841, network topology engine 111 adds the parent physical interface of the sub-interface as an entry in address location hash map 600 for ARP entry $a_e$, and method 800 proceeds to step 860.

In step 850, network topology engine 111 determines whether ARP entry $a_e$ points out of an interface that belongs to a fabric extender device (FEX) that is connected to network device $d_I$. If yes, method 800 proceeds to step 851; if no, method 800 proceeds to step 860. In step 851, network topology engine 111 adds the physical FEX uplink interface on network device $d_I$ as an entry in address location hash map 600 for ARP entry $a_e$, and method 800 proceeds to step 860.

In step 860, network topology engine 111 determines whether the physical interfaces need to be resolved for any remaining ARP entries for network device $d_I$. If yes, method 800 returns to step 801; if no, method 800 proceeds to step 861. In step 861, network topology engine 111 returns to step 801, where the next network device $d_I$ in data communication network 102 is selected.

Returning to FIG. 5, in step 503, network topology engine 111 populates a logical weighted flow graph of potential physical communication links between network interfaces of data communication network 102. Specifically, network topology engine 111 populates the logical weighted flow graph based on the flow identifiers 601 and other information included in address location hash map 600. One embodiment of such a flow graph of potential physical communication links between network interfaces is illustrated in FIG. 9.

Figure 9:
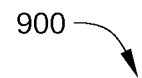
FIG. 9 schematically illustrates an unpopulated logical flow graph of device interfaces for a portion of a data communication network, according to an embodiment.

FIG. 9 schematically illustrates an unpopulated logical flow graph 900 of device interfaces for portion 230 of data communication network 102, according to an embodiment. For purposes of description, logical flow graph 900 is depicted in FIG. 9 as a two-dimensional graph. In practice, network topology engine 111 typically implements logical flow graph 900 as a virtual graph or data structure. As shown, each interface of network devices D1-D3 is represented as a node of logical flow graph 900. According to various embodiments, logical flow graph 900 is populated with directed, weighted edges between the nodes (i.e., the interfaces) of logical flow graph 900, where the weight of each such edge is incremented or decremented based on flow identifiers 601 of address location hash map 600.

Figure 10:
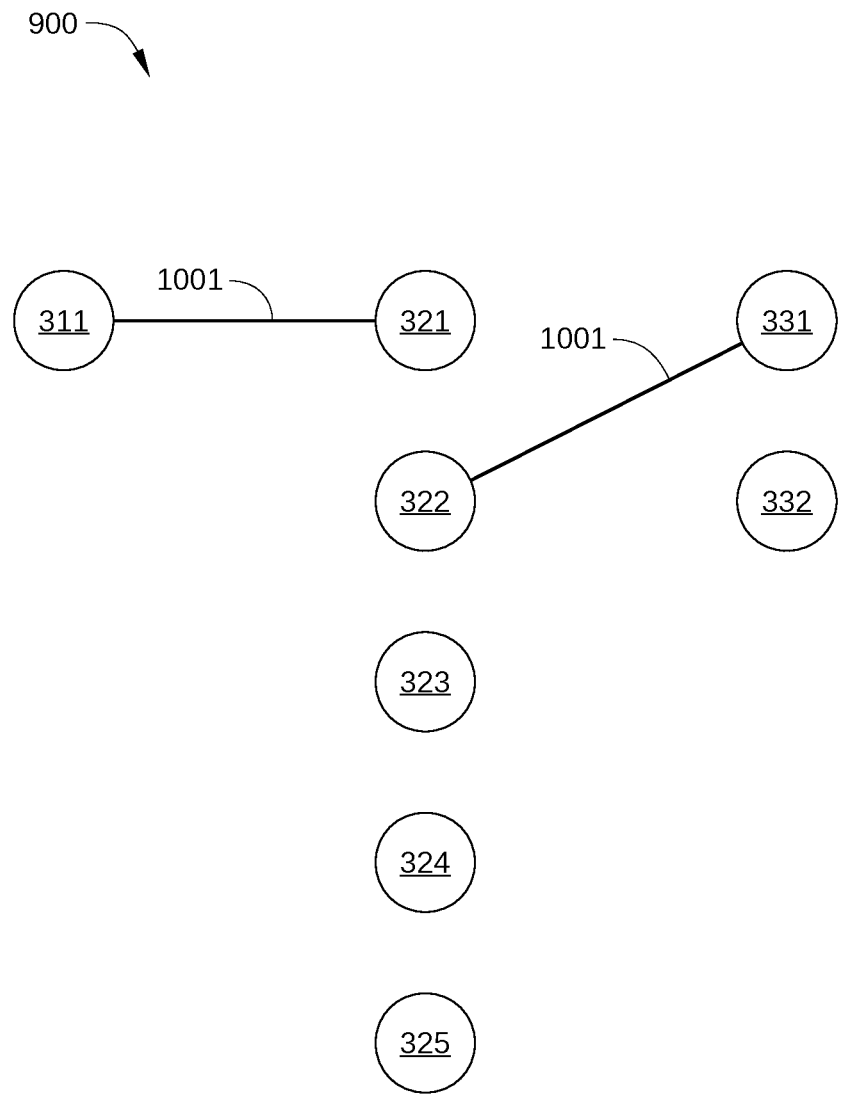
FIG. 10 schematically illustrates a logical flow graph after being populated with actual physical communication links inferred to be between network interfaces of a data communication network, according to an embodiment.

FIG. 10 schematically illustrates logical flow graph 900 after being populated with actual physical communication links inferred to be between network interfaces of data communication network 102, according to an embodiment. As shown, a graphical indicator, such as an edge 1001, is depicted in FIG. 10 for each physical communication link inferred to exist in data communications network 102. It is noted that each interface of flow graph 900 can only be coupled to a single corresponding interface by a physical communication link, since only a single physical cable can be coupled to each interface. Thus, each interface of flow graph 900 is connected to a single edge 1001 after edges with maximum weight have been selected to be the actual physical communication links between network interface. Once populated as shown, logical flow graph 900 enables the generation of a network topology. One embodiment for the populating of a logical flow graph for all of data communication network 102 is described below in steps 503-505.

Returning to FIG. 5, in step 503, network topology engine 111 populates a logical flow graph with potential physical communication links between network interfaces using the flow identifiers 601 of address location hash map 600. According to various embodiments, the logical flow graph is populated with potential physical communication links based on two assumptions. First, if the same traffic, as indicated by a particular flow identifier 601 (e.g., flow ID F1), is flowing between first and second network devices, there is potentially a physical communication link between the first and second network devices. Second, when the instance of data traffic is flowing out of a first interface I1 on the first network device to a second interface I2 on the second device, unless that data traffic is consumed on the second network device, a physical communication link cannot exist between I1 and I2. The second assumption is based on the fact that there cannot be simple L2 loops in data communication network 102. For example, when the ARP entry associated with a particular flow identifier (e.g., flow ID F1) in the first device points out of I1 and the ARP entry associated with that particular flow identifier in the second device points out of I2, then there cannot be a link between I1 and I2, since that would create an L2 loop between the first and second devices. This second assumption is applied in the algorithm outlined below.

Figure 11:
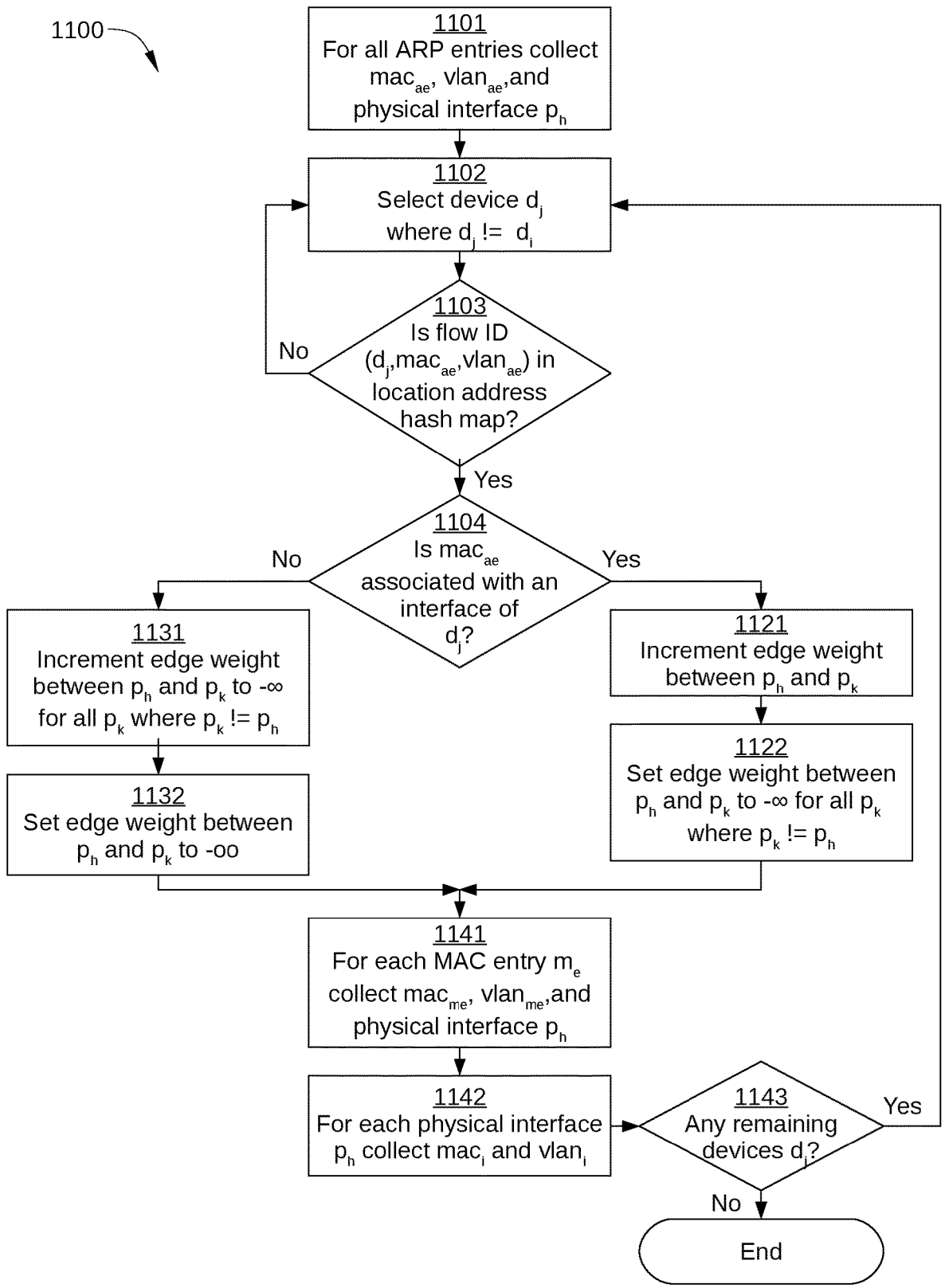
FIG. 11 sets forth a flowchart of method steps for populating a logical flow graph of network interface nodes with weighted, directed edges, according to an embodiment.

FIG. 11 sets forth a flowchart of method steps for populating a logical flow graph of network interface nodes with weighted, directed edges, according to an embodiment. The method steps are performed for a specific network device $d_I$ in data communication network 102. To complete all edges in a logical flow graph for data communication network 102, the method steps are performed for each network device in data communication network 102. Although the method steps are described in conjunction with network topology inference system 100 of FIG. 1-10, persons skilled in the art will understand that the method steps may be performed with other types of systems.

A method 1100 begins at step 1101, where network topology engine 111 collects reachability information for all ARP entries for network device $d_I$. In some embodiments, network topology engine 111 collects a destination MAC address $mac_{ae}$, the VLAN ID $vlan_{ae}$, and the physical interface $p_h$ for each ARP entry in step 1101. In step 1102, network topology engine 111 selects a network device $d_j$ from among the network device of data communication network 102, where network device $d_j$ is not the current network device $d_i$. Thus, $d_j != d_i$. In step 1103, network topology engine 111 determines whether a particular flow ID that includes $mac_{ae}$ and $vlan_{ae}$ and is associated with the currently selected network device $d_j$ is included in address location hash map 600. For example, in an embodiment, network topology engine 111 determines whether a flow identifier ($d_j$, $mac_{ae}$, $vlan_{ae}$) is present in address location hash map 600. If yes, method 1100 proceeds to step 1104; if no, method 1100 returns to step 2201. In step 1104, network topology engine 111 determines whether $mac_{ae}$ is associated with an interface of $d_j$. If yes, method 1100 proceeds to step 1121; if no, method 1100 proceeds to step 1131.

In step 1121, network topology engine 111 increments the edge weight between interfaces $p_h$ and $p_k$ in the logical flow graph. In step 1122, for all interfaces $p_k$ (where $p_k != p_j$), network topology engine 111 sets the edge weight between each interface $p_h$ and $p_k$ in the logical flow graph to $-\infty$. Method 1100 then proceeds to step 1141.

In step 1131, network topology engine 111 increments the edge weight between interfaces $p_h$ and $p_k$ in the logical flow graph. In step 1132, for all interfaces $p_k$ (where $p_k != p_h$), network topology engine 111 sets the edge weight between each interface $p_h$ and $p_k$ to $-\infty$ in the logical flow graph. Method 1100 then proceeds to step 1141.

In step 1141, network topology engine 111 collects reachability information for all MAC address entries for network device $d_I$. In some embodiments, in step 1141 network topology engine 111 collects a destination MAC address $mac_{me}$, the VLAN ID $vlan_{me}$, and the physical interface $p_h$ for each MAC address entry. In step 1142, network topology engine 111 collects reachability information for each physical interface $p_h$ for network device $d_I$. In some embodiments, network topology engine 111 collects an interface MAC address $mac_i$ and the VLAN ID $vlan_i$. Method 1100 then proceeds to step 1143. In step 1143, network topology engine 111 determines whether there are any remaining network devices $d_j$ to be checked for flow identifier ($d_j$, $mac_{ae}$, $vlan_{ae}$). If yes, method 1100 returns back to step 1102; if no, method 1100 ends. As a result, the logical flow graph of the device interfaces of data communication network 102 is populated with directed, weighted edges, where each directed edge indicates a potential physical communication link between two interfaces.

Returning to FIG. 5, in step 504, network topology engine 111 converts populated logical flow graph to an undirected, weighted graph. When a wired connection is established between two interfaces, data traffic can flow in both directions, and a bidirectional connection is formed. That is, physical communication links in data communication network 102 are undirected in nature. Consequently, the weighted directed graph generated via method 1100 is converted into a weighted undirected graph by adding the weights of edges between the same two interfaces. As a result, the weight of an edge in the newly generated undirected graph between two interfaces represents the total data traffic that flows (in both directions) between the two interfaces.

In step 505, network topology engine 111 selects edges with maximum weight between each pair of interface nodes that is connected by an edge. In this way, from all of the potential physical communications links that can exist based on the reachability information available in data communication network 102, the highest probability link between two interface nodes is selected. Further, to eliminate false positives, in some embodiments, an edge is chosen between interfaces only when that edge is the highest weighted edge flowing out of both nodes. Thus, in such embodiments, a statistical consensus is determined between data traffic flowing out of each interface node associated with a particular highest weighted edge. In this way, the highest weighted edge really is a physical communications link and not a false positive. One such embodiment for selecting edges with maximum weight is described below in conjunction with FIG. 12.

Figure 12:
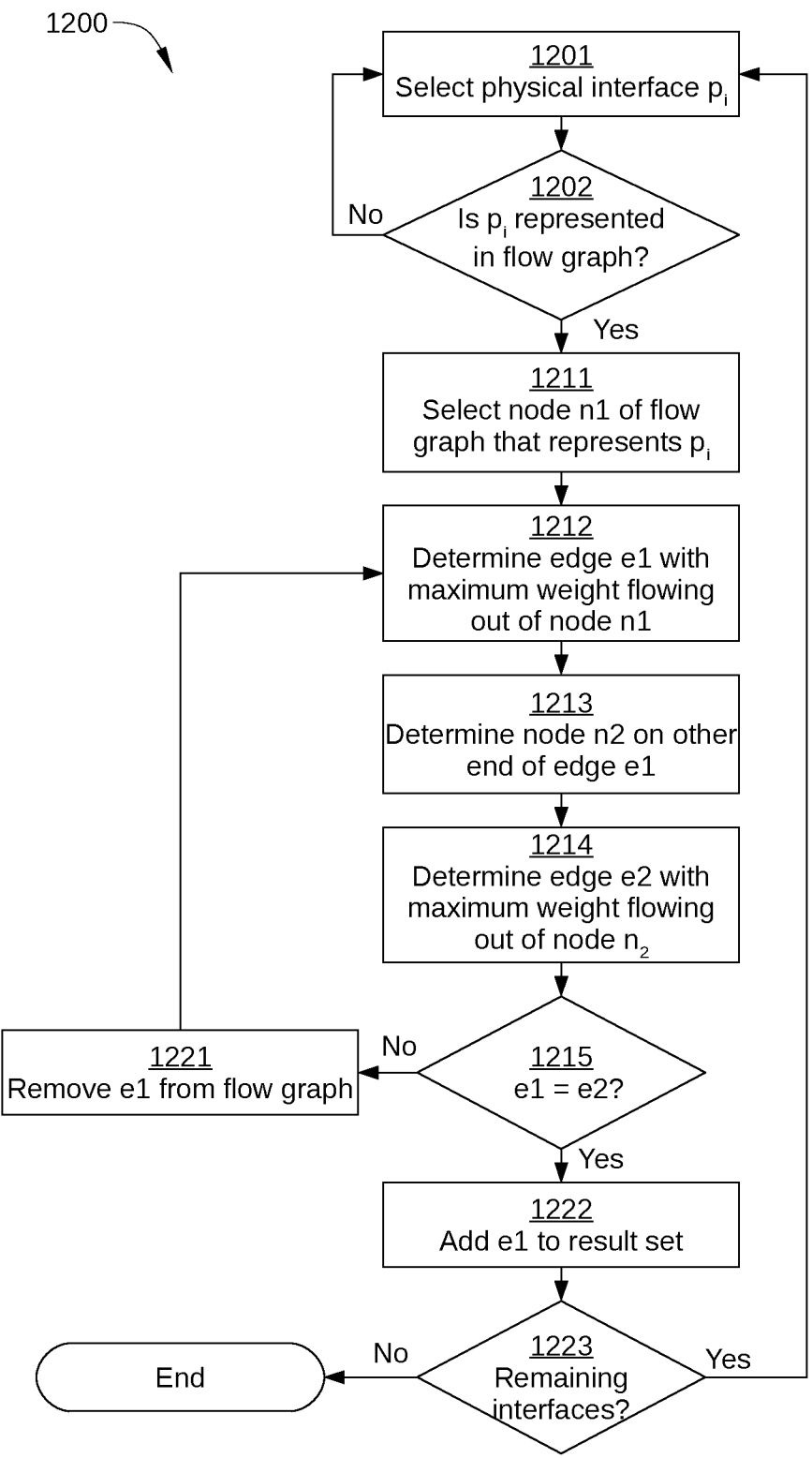
FIG. 12 sets forth a flowchart of method steps for selecting edges with maximum weight from a logical flow graph of network interface nodes, according to an embodiment.

FIG. 12 sets forth a flowchart of method steps for selecting edges with maximum weight from a logical flow graph of network interface nodes, according to an embodiment. The method steps are performed for a logical flow graph of network interface nodes that has been populated with weighted edges between some or all of the interface nodes. Although the method steps are described in conjunction with network topology inference system 100 of FIG. 1-11, persons skilled in the art will understand that the method steps may be performed with other types of systems.

A method 1200 begins at step 1201, where network topology engine 111 selects an interface $p_i$ from all of the interfaces included in data communications network 102. In step 1202, network topology engine 111 determines whether interface $p_i$ is represented in the logical flow graph. It is noted that an interface $p_i$ is represented in the logical flow graph as an interface node when there is at least one instance of a flow identifier associated with the interface $p_i$ in address location hash map 600. If yes, method 1200 proceeds to step 1211; if no, method 1200 returns to step 1201, where another network interface $p_i$ is selected.

In step 1211, network topology engine 111 selects the node n1 in the logical flow graph that represents $p_i$. In step 1212, network topology engine 111 determines the edge e1 associated with node n1 that has the maximum weight flowing out of node n1, i.e., the edge with the largest number of flow identifiers pointing from node n1 to a single other node. In step 1213, network topology engine 111 determines the node n2 that is disposed on the other end of edge e1. In step 1214, network topology engine 111 determines the edge e2 that has the maximum weight flowing out of node n2, i.e., the edge with the largest number of flow identifiers pointing from node n2 to a single other node. In step 1215, network topology engine 111 determines whether the endpoints of edge e1 and the endpoints of edge e2 are the same. If no, method 1200 proceeds to step 1221; if yes, method 1200 proceeds to step 1222.

Step 1221 is performed in response to a lack of consensus regarding edge e1 having maximum weight between nodes n1 and n2. Thus, in step 1221, network topology engine 111 removes edge e1 from the logical flow graph. Step 1222 is performed in response to a consensus being confirmed regarding edge e1 having maximum weight between nodes n1 and n2. Thus, in step 1222, network topology engine 111 adds edge e1 to the final flow graph used to generate a physical topology of data communication network 102. In addition, network topology engine 111 removes nodes n1 and n2 from the logical flow graph, since no other physical communication links can be associated with nodes n1 and n2. Further, network topology engine 111 removes potential links that are no longer possible when edge e1 is determined to be an actual physical communication link. For example, network topology engine 111 removes all edges out of nodes n1 and all edges out of n2. In step 1223, network topology engine 111 determines whether there are any remaining interfaces $p_i$ to be examined. If yes, method 1200 returns to step 1201. If no, method 1200 terminates.

Returning to FIG. 5, in step 506, network topology engine 111 generates a network topology based on the maximum weight edges determined in step 505. Thus, network topology engine 111 constructs a network topology which conforms to actual data traffic flow in data communication network 102 without monitoring actual data traffic within data communication network 102.

WAN Cloud Inference

Many organizations that rely on computer networks frequently have a plurality of networks. In addition to multiple data centers, a single organization can have branch offices and regional sites, and portions of certain networks deployed in a public cloud. Consequently, the networks of most organizations are usually fragmented, and communicate with each other using a public wide area network (WAN) that is most commonly provided by Internet service providers (ISPs). Because an organization with a network that is fragmented in a public cloud does not have any visibility into the these ISP-provided networks, modeling or otherwise understanding the behavior of the entire network is difficult or impossible. As a result, monitoring end-to-end behavior of the packet flows in such a fragmented network is not available to a network administrator.

According to various embodiments, network topology inference system 100 enables a network administrator to monitor how packets flow from one portion of a network, through a WAN cloud, and into another portion of the network. Thus, even though a network is fragmented across a public WAN, the network administrator can monitor packets flowing through some representation of this WAN cloud and into his known networks. In such embodiments, for a network having a known topology that is fragmented across a WAN, interfaces within the known topology that connect to the WAN are specified. In addition, how these interface use the WAN (e.g., via L3 VPN or L2 VPN) are also specified. Based on such information, network topology inference system 100 generates representative WAN cloud devices and models the behavior of the representative WAN cloud devices. In addition, when a network topology is displayed to the user, these additional representative WAN cloud devices are included in the user interface and are connected on the interfaces specified by the user to connect to the WAN. Consequently, when a user does a search for particular data traffic between two network fragments, the user sees the data traffic leaving the known topology of one network fragment, pass into the WAN via the representative WAN cloud devices, then leave the WAN to go into the known topology of another network fragment. One such embodiment is described below in conjunction with FIG. 13.

Figure 13:
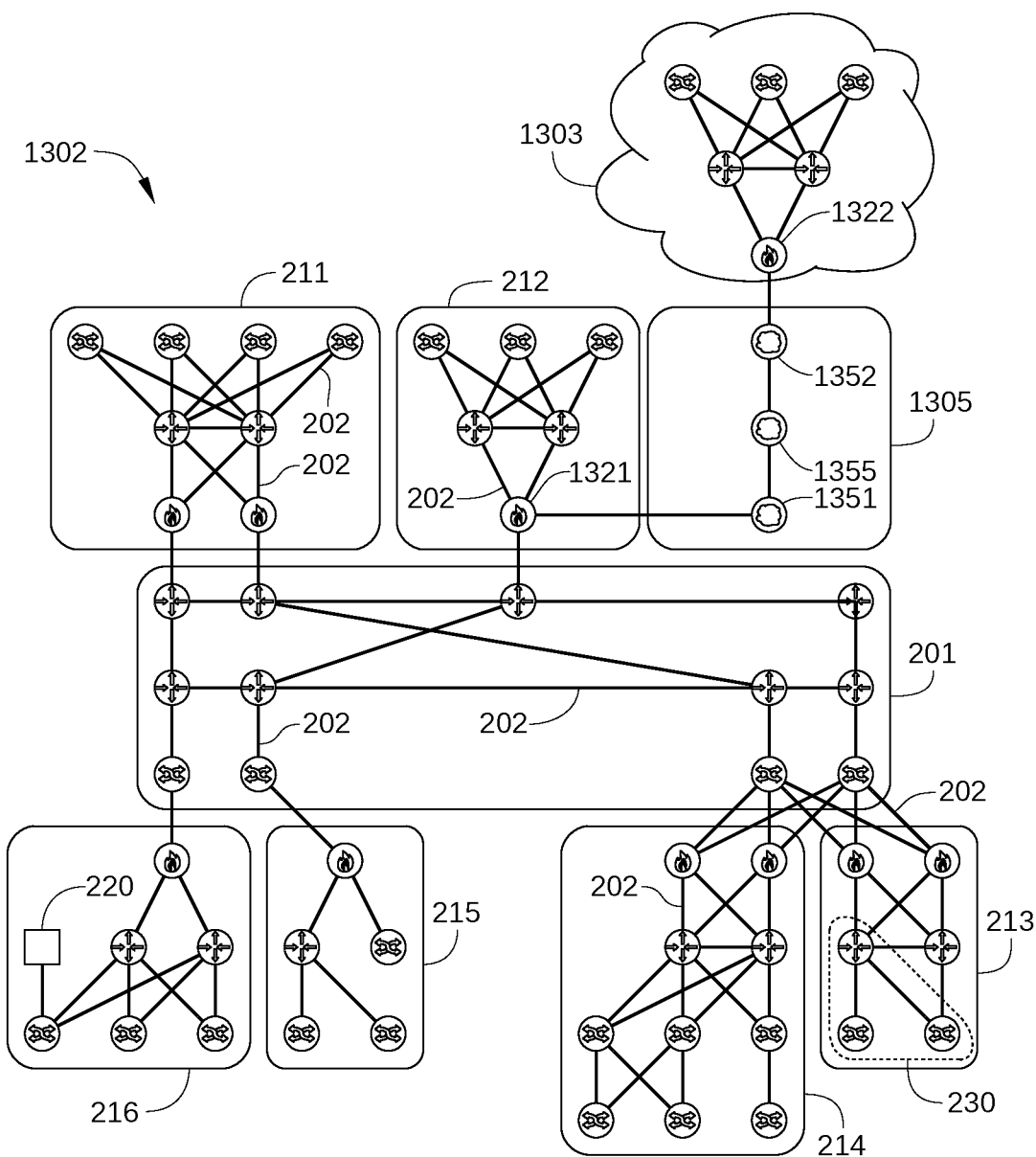
FIG. 13 is a schematic illustration of a data communication network2, according to an embodiment.

FIG. 13 is a schematic illustration of data communication network 1302, according to an embodiment. Data communication network 1302 is a computer network that is substantially similar to data communication network 102 of FIG. 2, except that data communication network 1302 further includes a remote subnet 1303. Remote subnet 1303 is implemented in a public cloud computing environment, such as Amazon Web Services or Google Cloud Platform, and is communicatively coupled to data communication network 1302 via a WAN 1305, such as the Internet.

According to various embodiments, when a search for particular data traffic is performed by an administrator of data communication network 1302 from an on-premise network (e.g., subnet 211) to remote subnet 1303, the traffic flows from the on-premise network, through WAN 1305, and into remote subnet 1303. In some embodiments, network modeler 105 or some other analysis module of network topology inference system 100 models and displays such traffic flows based on a previously generated model of WAN 1305. A method for generating such a model is described below in conjunction with FIG. 14.

Figure 14:
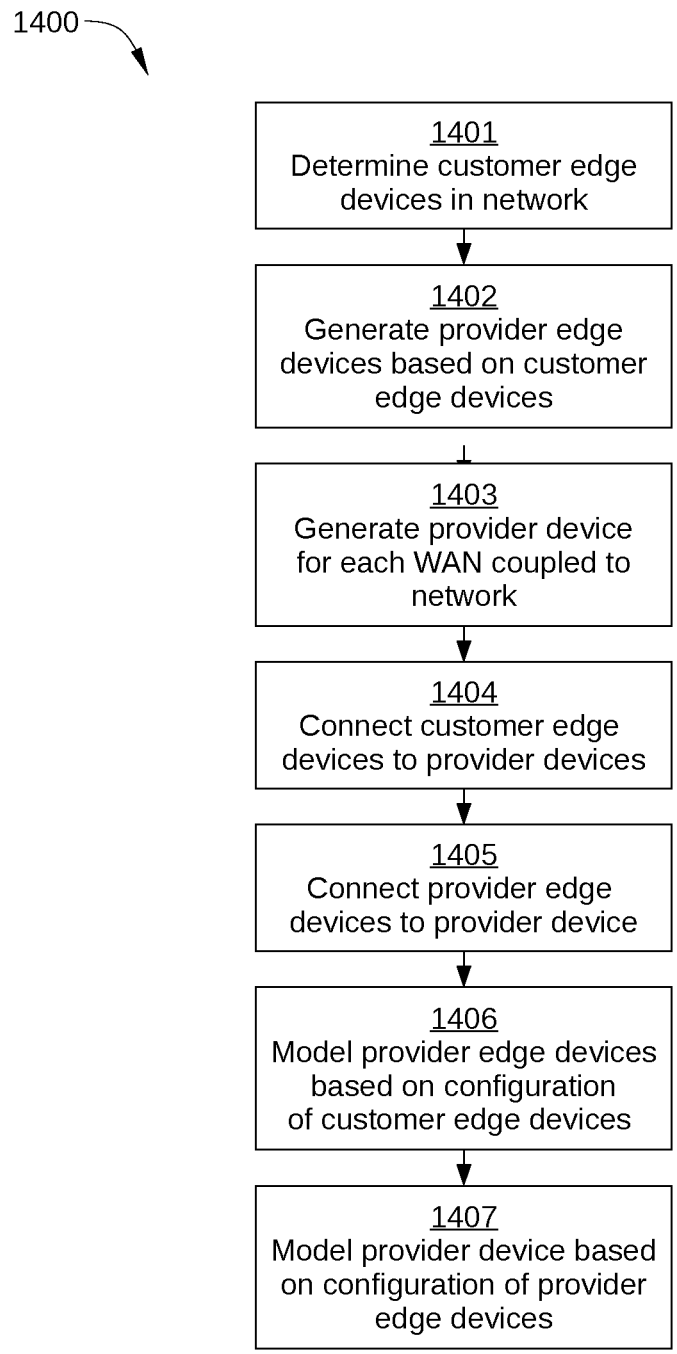
FIG. 14 sets forth a flowchart of method steps for inferring physical communication links in a data communication network, according to an embodiment.

FIG. 14 sets forth a flowchart of method steps for inferring physical communication links in a data communication network, according to an embodiment. Although the method steps are described in conjunction with network topology inference system 100 of FIGS. 1-13, persons skilled in the art will understand that the method steps may be performed with other types of systems.

A method 1400 begins at step 1401, when network modeler 105 determines customer edge devices, for example by identifying all network devices in data communication network 1302 that are at an edge of data communication network 1302 and can therefore connect to WAN 1305. In some embodiments, such customer edge devices are specified by a network user. Alternatively or additionally, network modeler 105 can infer which network devices in data communication network are edge devices based on the contents of certain reachability information associated with the edge devices. In the embodiment illustrated in FIG. 13, edge devices of data communication network 1302 include a firewall 1321 in subnet 1303 and a firewall 1322 in remote subnet 1303. Thus, data communication network 1302 is fragmented across WAN 1305.

In embodiments in which network modeler 105 determines customer edge (CE) devices based on user input, such input may include additional information. In some embodiments, the user input indicates which interface of a specific CE device connects to WAN 1305. Alternatively or additionally, in some embodiments, the user input indicates what service is provided by or available from WAN 1305, e.g., L2VPN, L3VPN, or point-to-point service. Alternatively or additionally, in some embodiments, the user input indicates a specific name or other identifier for WAN 1305 and/or other administrative information.

In step 1402, network modeler 105 generates provider edge (PE) devices. Generally, network modeler 105 generates one PE device for each CE device interface that is indicated to connect to WAN 1305. Conceptually, each PE device is a representation of what is present on the other side of the edge link associated with a particular CE device, since state, configuration, or other information generally cannot be collected from network devices in WAN 1305. Instead, each PE device is assumed to exist and connect to a corresponding CE device. In the embodiment illustrated in FIG. 13, PE device 1351 is added to the network topology of data communication network 1302 and connected to firewall 1321 and PE device 1352 is added to the network topology of data communication network 1302 and connected to firewall 1322. In this way, network modeler 105 captures the fact that multiple edges of data communication network 1302 are connected with each other via WAN 1305.

In the embodiment illustrated in FIG. 13, data communication network 1302 is connected to a single ISP. In other embodiments, data communication network 1302 can include multiple exit points that each connect through a different ISP, for example for redundancy. In such embodiments, a user can specify which CE devices are coupled to which ISPs, and each ISP is subsequently modeled as a different WAN. For clarity of description, method 1400 is described in terms of data communication network 1302 being connected to a single WAN.

In step 1403, network modeler 105 generates a provider (P) device for each WAN coupled to data communication network 1302. Thus, in the embodiment illustrated in FIG. 13, network modeler 105 generates a P device 1355 that connects PE devices 1351 and 1352. Similar to PE devices 1351 and 1352, P device 1355 is an abstract representation of a portion of WAN 1305. Specifically, P device 1355 represents the entire network of WAN 1305 as a single network device.

In step 1404, network modeler 105 connects the CE devices (firewall 1321 and firewall 1322) to corresponding PE devices (PE devices 1351 and 1352). In so doing, network modeler 105 creates an interface on PE device 1351 from which data traffic flows to and from firewall 1321 and an interface on PE device 1352 from which data traffic flows to and from firewall 1322.

In step 1405, network modeler 105 connects PE devices 1351 and 1352 to P device 1355. In so doing, network modeler 105 creates an interface on PE device 1351 from which data traffic flows to and from P device 1355 and an interface on PE device 1352 from which data traffic flows to and from P device 1355.

In step 1406, network modeler 105 models PE devices 1351 and 1352, based on CE device configuration information available to network modeler 105. One embodiment of a method of modeling a PE device is described below in conjunction with FIG. 15.

Figure 15:
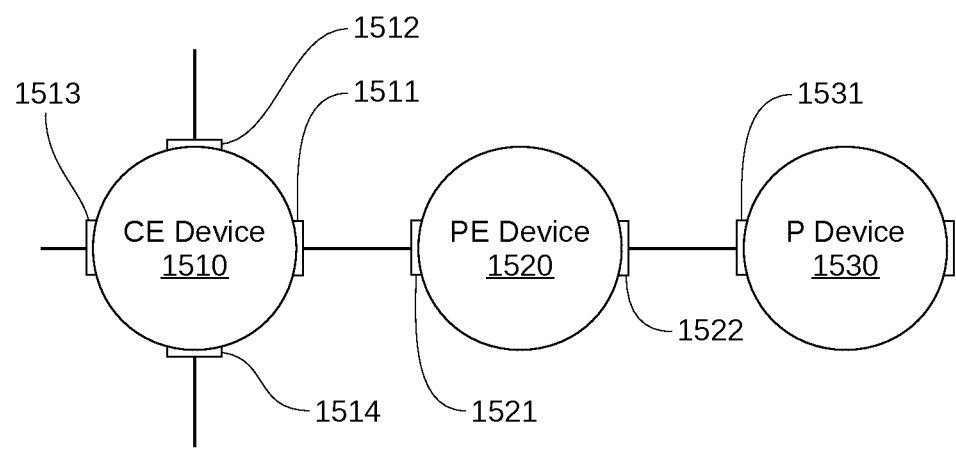
FIG. 15 schematically illustrates a customer edge device, a provider edge device communicatively coupled to the device, and a provider device communicatively coupled to the provider edge device, according to an embodiment.

FIG. 15 schematically illustrates a CE device 1510, a PE device 1520 communicatively coupled to CE device 1510, and a P device 1530 communicatively coupled to PE device 1520, according to an embodiment. In the embodiment, CE device 1510 include four interfaces 1511-1514 and PE device 1520 include two interfaces 1521 and 1522. In other embodiments, CE device 1510 can include more or fewer than four interfaces, and PE device 1520 can include more than two interfaces. In some embodiments, the modeling of PE device 1520 is based on a routing table of CE device 1510. One embodiment of a routing table of CE device 1510 is described below in conjunction with FIG. 16.

FIG. 16 is a schematic illustration of a routing table 1600 of CE device 1510, according to an embodiment. As shown, routing table 1600 includes an Internet protocol (IP) address range 1601 for each of interfaces 1511-1514. Thus, based on the IP address of a packet received by CE device 1510 and information included in routing table 1600, CE device 1510 routes the packet out of a particular interface. In the embodiment illustrated in FIG. 16, interfaces 1512-1514 are each communicatively coupled to subnets within data communication network 1302, while interface 1511 is communicatively coupled to PE device 1520.

Based on the entries in routing table 1600 and the connectivity of CE device 1520 shown in FIG. 15, CE device 1510 routes specified IP address ranges of packets to subnets within data communication network 1302, out of interfaces 1512-1513, and routes a remaining specified IP address range (or ranges) of packets to P device 1530 out of interface 1511. In light of this behavior, network modeler 105 models PE device 1520 to route packets, via interface 1521, to CE device 1510 for the subnets connected on interfaces 1512-1513, since CE device 1510 is configured to then route such packets accordingly within data communication network 1302. Network modeler 105 further models PE device 1520 to route packets, via interface 1522, for any remaining IP address ranges to P device 1530. In some embodiments, the above-described modeling of PE device 1520 is implemented as a routing table. One such embodiment is described below in conjunction with FIG. 17.

FIG. 17 is a schematic illustration of a routing table 1700 of PE device 1520, according to an embodiment. As shown, routing table 1700 includes an Internet protocol (IP) address range 1701 for each of interfaces 1521 and 1522. Thus, based on the IP address of a packet received by PE device 1520 and information included in routing table 1700, PE device 1520 routes packets for certain IP address ranges to CE device 1520 out of interface 1521 and packets for certain other IP address ranges to PE device 1530 out of interface 1522. Specifically, packets for IP address ranges that CE device 1520 is programmed to route within data communication network 1302 are sent to CE device 1520 via interface 1521, while packets for any remaining IP address ranges are sent to P device 1530 via interface 1522.

In some embodiments, for example in a network in an L3VPM scenario, network modeler 105 is configured to model each PE device associated with data communication network 1302 according to the following three rules: 1) For each L3 route in the CE device that is connected to the PE device being modeled, when the route points to the PE device, the route is ignored by the PE device being modeled; 2) For each L3 route in the CE device that is connected to the PE device being modeled, when the route does not point to the PE device, the route is copied over to the PE device, and traffic associated with the route is sent by the PE device being modeled to the CE device; 3) All remaining traffic is sent by the PE device to the connected P device, for example via a default route.

Returning to FIG. 14, in step 1407, network modeler 105 models P device 1355 using similar logic to that employed in modeling PE device 1530. That is, the modeling of P device 1355 is based on the PE device configuration information modeled for any PE devices connected to P device 1355. In some embodiments, network modeler 105 is configured to model each P device associated with data communication network 1302 according to the following rule: For each PE that is connected to the P device being modeled, each route in the PE device that points out of the PE device is copied over to the P device, and therefore traffic associated with the route is sent by the P device being modeled to the PE device. For example, in the embodiment illustrated in FIG. 15, P device 1530 examines the connected PE device 1520 and detects four routes. Out of the four routes, there are three routes that do not point towards P device 1530 and one route that does. Therefore, P device 1530 copies over the three routes that point away from PE device 1520 and sends that traffic to PE device 1520. A resultant routing table for P device 1530 after being modeled by network modeler 105 is illustrated in FIG. 18.

Figure 18:
FIG. 18 is a schematic illustration of a routing table of the provider device of FIG. 15, according to an embodiment.

FIG. 18 is a schematic illustration of a routing table 1800 of P device 1530, according to an embodiment. As shown, routing table 1800 includes an Internet protocol (IP) address range 1801 for interface 1531. Due to the modeling of the PE devices and P devices of WAN 1305, routing table 1800 reflects traffic flow to certain subnets of data communication network 1302 that are handled by the CE device(s) that connect to PE devices (e.g., PE device 1520). Thus, the abstract PE devices and P devices generated by network modeler 105 are programmed to send such traffic to the appropriate CE devices of data communication network 1302.

It is noted that the example embodiments described above are simplified. In practice, data communication network 1302 often includes a plurality of CE devices. As a result, the behavior of the modeled PE devices and P devices becomes more complex, as different routes are fed into the modeled PE devices and P devices from different edges of data communication network 1302. However, after all PE devices and P devices are appropriately programmed, each PE device and P device knows which subnets are behind which of the CE devices of data communication network 1302, and therefore route traffic to the appropriate CE device. Thus, a complete model of the behavior of data communication network 1302 can be generated, even though data communication network 1302 is fragmented across one or more WANs.

Host Inference

Having an up-to-date knowledge of where active end hosts are located in a data communication network can be important information for a network administrator to have. For example, a network administrator can employ such information to validate whether an end host is correctly located, which in turn facilitates design of micro-segmentation rules in the network. In addition, end host location information can provide insight into what traffic is currently flowing in the network without actually monitoring network traffic with agents, which can facilitate capacity planning of the data communication network. For example, if too many hosts are communicating from one particular interface in the network, more bandwidth can be provided to that particular interface, or some of the hosts can be relocated to a different interface. While in a software-defined network, a network controller already knows the locations of all hosts in the network, in a physical data communication network, such information is generally not stored in any central database.

According to various embodiments, network topology inference system 100 determines the locations of end hosts based on reachability information of network devices, such as entries in ARP tables and MAC address tables. It is noted that ARP table entries and MAC address table entries give information only about the active hosts in the network. As a result, the embodiments described here infer the locations of hosts that are actively communicating in the network.

In some embodiments, network topology inference system 100 generates a located hosts map. In such embodiments, the located hosts map includes the hosts in a data communication network and the known location of each host, for example via a tuple: {Host IP address, Host MAC Address, Interface (to which the hosts connects in the network)}. In the embodiments, network topology inference system 100 generates the located hosts map for a data communication network by looping through all the ARP entries in the network and determining what IP addresses are present in the network. When the ARP entry is directly connected to an unknown device, it is assumed that a host associated with the ARP entry is directly connected to that network device. When the ARP entry is not directly connected to an unknown device, network topology inference system 100 walks across a few devices to resolve where the host is actually connected. The IP addresses associated with the additional resolution procedure are stored in a temporary map referred to herein as a needs resolution map. Once all ARP entries in the network are examined for connection to known and unknown devices, network topology inference system 100 loops through the needs resolution map, walking across all the devices until an end point for that particular IP is reached. One such embodiment for generating a located hosts map in this way is described below in conjunction with FIG. 20.

Figure 19:
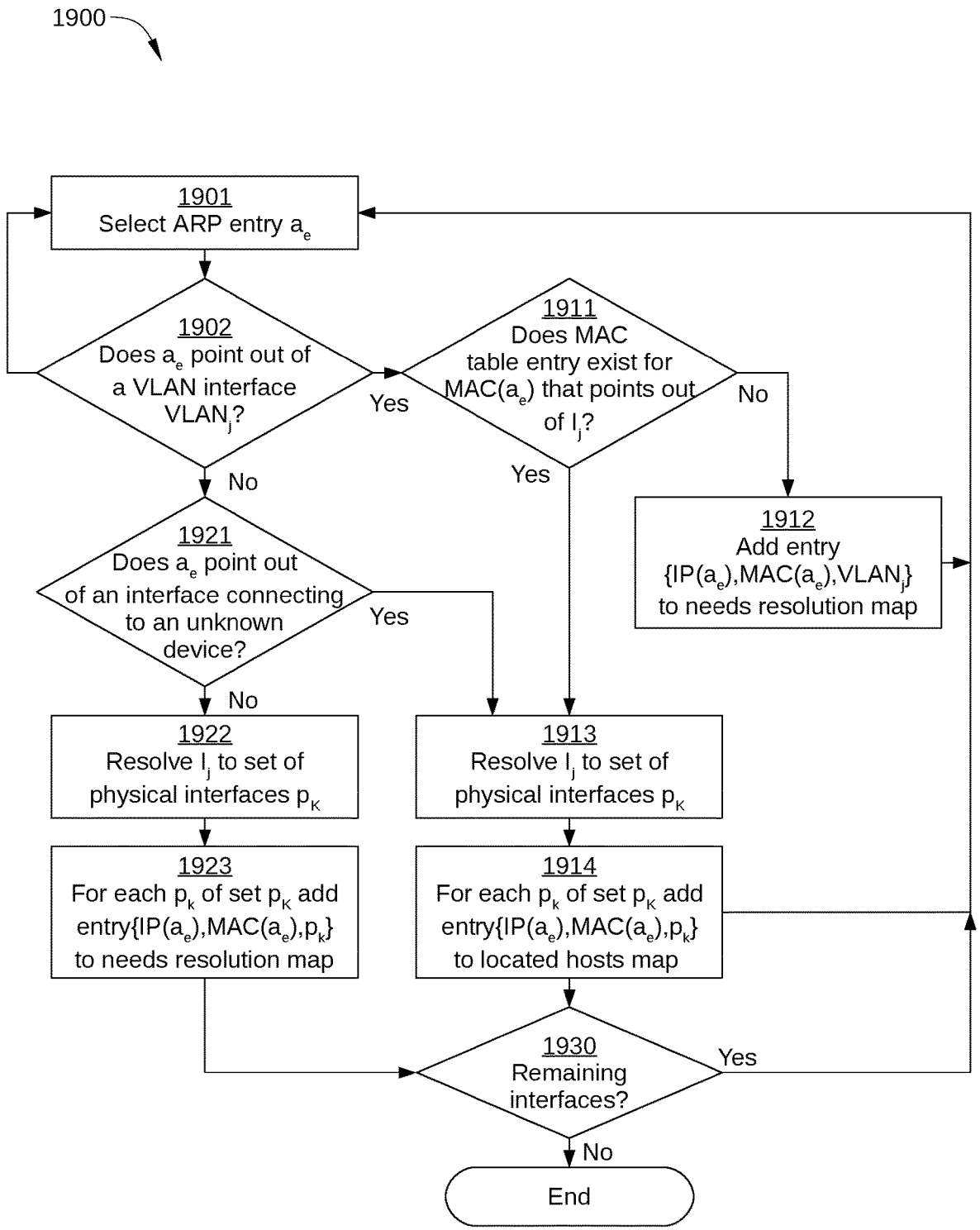
FIG. 19 sets forth a flowchart of method steps for inferring host locations in a data communication network, according to an embodiment.

FIG. 19 sets forth a flowchart of method steps for inferring host locations in a data communication network, according to an embodiment. The method steps are performed for a specific network device $d_I$ in data communication network 102. To complete determining the location of all active hosts within data communication network 102, the method steps are performed for each network device in data communication network 102. Although the method steps are described in conjunction with network topology inference system 100 of FIGS. 1-18, persons skilled in the art will understand that the method steps may be performed with other types of systems.

A method 1900 begins at step 1901, when network modeler 105 selects an ARP entry $a_e$ from ARP table 420 for the instant network device $d_I$. In step 1902, network topology engine 111 determines whether the selected ARP entry $a_e$ directly points out of a VLAN interface $VLAN_j$ in network device $d_I$, where network device $d_I$ includes J interfaces. If yes, method 1900 proceeds to step 1911; if no, method 1900 proceeds to step 1921.

In step 1911, network modeler 105 determines whether a MAC table entry exists for the MAC address value $MAC(a_e)$ for the ARP entry $a_e$ selected in step 1901. If the MAC table entry does exist, network modeler 105 further determines whether the MAC table entry points out of an interface $I_j$. If no, method 1900 proceeds to step 1912; if yes, method 1900 proceeds to step 1923. In step 1912, network modeler 105 adds the entry $\{IP(a_e), MAC(a_e), VLAN_j\}$ to the needs resolution map, and method 1900 returns to step 1901 for the selection of another ARP entry $a_e$. In step 1913, network modeler 105 resolves interface to a set of physical interfaces $p_K$ (where interface $I_j$ is associated with K physical interfaces). In step 1913, network modeler 105 resolves interface $I_j$ to a set of physical interfaces $p_K$ using any suitable algorithm for resolving physical interfaces from a virtual interface. One such algorithm is described below. In step 1914, network modeler 105 adds an entry for each physical interface $p_k$ of the set of physical interfaces $p_K$ to a located hosts map. For example, in an embodiment, network modeler 105 adds the entry $\{IP(a_e), MAC(a_e), p_k\}$ to the located hosts map. Method 1900 then proceeds to step 1930.

In step 1921, network modeler 105 determines whether ARP entry $a_e$ points out of an interface connecting to a known or an unknown device. If yes, method 1900 proceeds to step 1913, and entries are added to the located hosts map as set forth in steps 1913 and 1914. If no, method 1900 proceeds to step 1922. In step 1922, network modeler 105 resolves interface $I_j$ to set of physical interfaces $p_K$ using any suitable algorithm for resolving physical interfaces from a virtual interface. One such algorithm is described below. In step 1923, network modeler 105 adds an entry for each physical interface $p_k$ of the set of physical interfaces $p_K$ to the needs resolution map. For example, in an embodiment, network modeler 105 adds the entry $\{IP(a_e), MAC(a_e), p_k\}$ to the needs resolution map. Method 1900 then proceeds to step 1930.

In step 1930, network modeler 105 determines whether there are any remaining ARP entries $a_e$ for network device $d_I$. If yes, method 1900 returns to step 1901; if no, method 1900 terminates for the current network device $d_I$.

In steps 1913 and 1922 of method 1900, an algorithm for resolving physical interfaces from a virtual interface is referenced. Such an algorithm can be applied to each ARP entry $a_e$ included in the needs resolution map generated by method 1900. In some embodiments, when an ARP entry $a_e$ directly points out of a physical interface $p_I$, the algorithm returns $p_I$ as the physical interface. In some embodiments, when an ARP entry $a_e$ points out of a tunnel interface, the algorithm returns the physical interface through which traffic flows out of the tunnel interface as the physical interface. In some embodiments, when an ARP entry $a_e$ points out of a sub-interface, the algorithm returns the parent physical interface as the physical interface. In some embodiments, when an ARP entry $a_e$ points out of a port-channel interface, the algorithm returns all the interfaces that belong to or are otherwise associated with the port channel as the physical interface. In some embodiments, when an ARP entry $a_e$ points out of an interface that belongs to an FEX, the algorithm returns the physical FEX uplink interface as the physical interface.

In method 1900, a needs resolution map is populated with IP addresses that have not been resolved to a host device. For example, in some embodiments, the needs resolution map is populated with tuples: $\{IP_I, MAC_I, I_I\}$. In such embodiments, when $I_I$ represents a physical interface $p_I$, that physical interface $p_I$ is added to a list of physical interfaces to be resolved to a host device. When $I_I$ is a VLAN interface, that VLAN interface is resolved to the physical interfaces associated that VLAN interface, and each such physical interface is added to the list of physical interfaces to be resolved to a host device.

In some embodiments, an algorithm for resolving such a list of physical interfaces to respective host devices is employed to complete the located host map. In such embodiments, for each physical interface in the list of physical interfaces to be resolved to a host device, such an algorithm walks down the tree of connected devices to a point where the device connects to an unknown device. When a device connects to an unknown device, the edge of the network has been reached. Consequently, the unknown device is determined to be a host and is added to the located hosts map. An embodiment of one such algorithm is described below in conjunction with FIG. 20.

Figure 20:
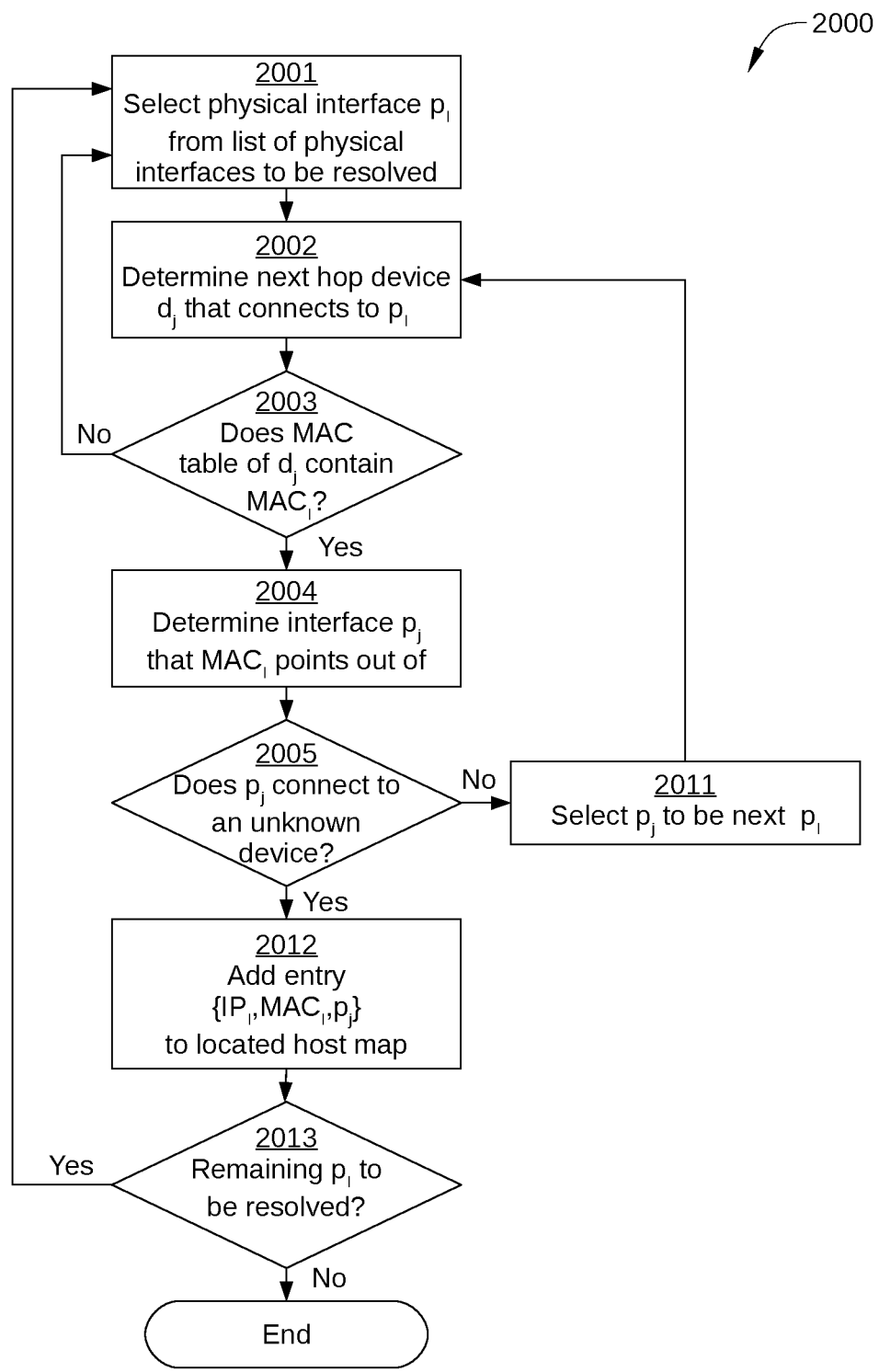
FIG. 20 sets forth a flowchart of method steps for determining host devices based on a list of physical interfaces of a data communication network, according to an embodiment.

FIG. 20 sets forth a flowchart of method steps for determining host devices based on a list of physical interfaces of a data communication network, according to an embodiment. The method steps are performed on a list of physical interfaces $p_I$ in data communication network 102 that have not been determined to be connected to a host or a network device. For example, in some embodiments, the list of physical interfaces $p_I$ is extracted from or otherwise based on the needs resolution map referenced in method 1900. Although the method steps are described in conjunction with network topology inference system 100 of FIGS. 1-19, persons skilled in the art will understand that the method steps may be performed with other types of systems.

A method 2000 begins at step 2001, when network modeler 105 selects a physical interface $p_I$ from the list of physical interfaces to be resolved to a host device that is generated from the needs resolution map. In step 2002, network modeler 105 determines the next hop device $d_j$ that connects to the physical interface $p_I$ selected in step 2001. In step 2003, network modeler 105 determines whether the MAC table of next hop device $d_i$ contains the MAC address $MAC_I$ of the physical interface $p_I$ selected in step 2001. If no, method 2000 returns to step 2001; if yes, method 2000 proceeds to step 2004. In step 2004, network modeler 105 determines the physical interface $p_j$ that $MAC_I$ points out of. In step 2005, network modeler 105 determines whether physical interface $p_j$ connects to an unknown device. That is, network modeler 105 determines whether physical interface $p_j$ connects to a host (unknown) device or a network (known) device. If physical interface $p_j$ connects to a known device, method 200 proceeds to step 2011; if physical interface $p_j$ connects to an unknown device, method 200 proceeds to step 2012.

In step 2011, network modeler 105 selects physical interface $p_j$ to be the next physical interface $p_I$ to be examined, and method 2000 returns back to step 2002. In step 2012, network modeler 105 adds an entry associated with physical interface $p_j$ to the located host map. For example, in an embodiment, network modeler 105 add an entry {$IP_I$,$MAC_I$, $p_j$}, since physical device $p_j$ indicates connection to a host device. In step 2013, network modeler 105 determines whether there are any remaining physical interfaces $p_I$ to be resolved to a host device. If yes, method 2000 returns to step 2001; if no, method 2000 terminates and the located host map is complete.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

We claim:

1. In a network of devices including at least first, second, and third devices, a method of determining connections between the devices using reachability information stored in the devices, said method comprising:

collecting, without monitoring data traffic within the network and without inferring from data traffic transmitted within the network, the reachability information from each of the devices, the reachability information being data stored for each of the devices prior to collection;

generating a list of potential links between an interface on one of the devices and an interface on another one of the devices in the form of a logical weighted flow graph where the interfaces of the devices are nodes and the potential links are edges between the nodes, based on the reachability information, the potential links including a first link between an interface on the first device and an interface on the second device, and a second link between the interface on the first device and an interface on the third device;

converting the logical weighted flow graph to an undirected and weighted graph by adding weights on edges between pairs of interfaces including a first edge corresponding to the first link and a second edge corresponding to the second link;

comparing, based on the weights of the edges in the undirected and weighted graph, a likelihood of a first connection between the interface on the first device and the interface on the second device, and a likelihood of a second connection between the interface on the first device and the interface on the third device; and determining that the first connection, and not the second connection, exists in the network of devices when the likelihood of the first connection is greater than the likelihood of the second connection as determined by the weights on the first and second edges.

2. The method of claim 1, wherein collecting the reachability information comprises collecting at least a portion of the reachability information from at least one of an address resolution protocol table for at least one of the devices, a media access control address table for at least one of the devices, and interface configuration information for at least one of the devices.

3. The method of claim 2, wherein the reachability information comprises at least one of device identification information, an Internet address value, and virtual large area network identification information.

4. The method of claim 1, further comprising:

determining a first weight of the first connection between the interface on the first device and the interface on the second device;

determining a second weight of the second connection between the interface on the first device and the interface on the third device; and determining the likelihood of the first wired connection being greater than the likelihood of the second connection based on the first weight and the second weight.

5. The method of claim 4, further comprising, prior to determining the likelihood of the first connection being greater than the likelihood of the second connection, determining that the first weight is greater than a weight of any other connection to the interface on the first device.

6. The method of claim 4, wherein:

determining the first weight comprises determining a first number of instances of flow identifiers indicating data traffic between the interface on the first device and the interface on the second device; and determining the second weight comprises determining a second number of instances of flow identifiers indicating data traffic between the interface on the first device and the interface on the third device.

7. The method of claim 6, wherein:

determining the first number of instances comprises combining a number of instances of flow identifiers indicating data traffic from the interface on the first device to the interface on the second device with a number of instances of flow identifiers indicating data traffic from the interface on the second device to the interface on the first device; and determining the second number of instances comprises combining a number of instances of flow identifiers indicating data traffic from the interface on the first device to the interface on the third device with a number of instances of flow identifiers indicating data traffic from the interface on the third device to the interface on the first device.

8. The method of claim 1, wherein generating the list of potential links between an interface on one of the devices and an interface on another one of the devices comprises:

generating a flow identifier indicating data traffic between the interface on the one of the devices and the interface on the another one of the devices; and adding a potential link to the list of potential links based on the flow identifier.

9. The method of claim 8, wherein the flow identifier is based on the reachability information.

10. The method of claim 9, wherein the reachability information includes a destination media access control (MAC) address collected from a MAC address table of one of the devices.

11. The method of claim 9, wherein the reachability information includes a virtual large area network (VLAN) identification collected from a MAC address table of one of the devices.

12. The method of claim 1, wherein the first connection between the interface on the first device and the interface on the second device and the second connection between the interface on the first device and the interface on the third device are each a wired connection.

13. A non-transitory computer-readable storage medium comprising instructions which when executed by a computer system cause the computer system to carry out a method of determining connections between devices in a network including at least first, second, and third devices, using reachability information stored in the devices, said method comprising:

obtaining, without monitoring data traffic within the network, the reachability information directly from each of the devices, the reachability information being data stored for each of the devices prior to collection;

generating a list of potential links between an interface on one of the devices and an interface on another one of the devices in the form of a logical weighted flow graph where the interfaces of the devices are nodes and the potential links are edges between the nodes, based on the reachability information, the potential links including a first link between an interface on the first device and an interface on the second device, and a second link between the interface on the first device and an interface on the third device;

converting the logical weighted flow graph to an undirected and weighted graph by adding weights on edges between pairs of interfaces including a first edge corresponding to the first link and a second edge corresponding to the second link;

comparing, based on the weights of the edges in the undirected and weighted graph, a likelihood of a first connection between the interface on the first device and the interface on the second device, and a likelihood of a second connection between the interface on the first device and the interface on the third device; and determining that the first connection, and not the second connection, exists in the network of devices when the likelihood of the first connection is greater than the likelihood of the second connection as determined by the weights on the first and second edges.

14. The non-transitory computer-readable storage medium of claim 13, wherein collecting the reachability information comprises collecting at least a portion of the reachability information from at least one of an address resolution protocol table for at least one of the devices, a media access control address table for at least one of the devices, and interface configuration information for at least one of the devices.

15. The non-transitory computer-readable storage medium of claim 14, wherein the reachability information comprises at least one of device identification information, an Internet address value, and virtual large area network identification information.

16. The non-transitory computer-readable storage medium of claim 13, wherein the method further comprises:

determining a first weight of the first connection between the interface on the first device and the interface on the second device;

determining a second weight of the second connection between the interface on the first device and the interface on the third device; and determining the likelihood of the first wired connection being greater than the likelihood of the second connection based on the first weight and the second weight.

17. The non-transitory computer-readable storage medium of claim 16, wherein the method further comprises:

prior to determining the likelihood of the first connection being greater than the likelihood of the second connection, determining that the first weight is greater than a weight of any other connection to the interface on the first device.

18. The method of non-transitory computer-readable storage medium 16, wherein:

determining the first weight comprises determining a first number of instances of flow identifiers indicating data traffic between the interface on the first device and the interface on the second device; and determining the second weight comprises determining a second number of instances of flow identifiers indicating data traffic between the interface on the first device and the interface on the third device.

19. The method of non-transitory computer-readable storage medium 18, wherein:

determining the first number of instances comprises combining a number of instances of flow identifiers indicating data traffic from the interface on the first device to the interface on the second device with a number of instances of flow identifiers indicating data traffic from the interface on the second device to the interface on the first device; and determining the second number of instances comprises combining a number of instances of flow identifiers indicating data traffic from the interface on the first device to the interface on the third device with a number of instances of flow identifiers indicating data traffic from the interface on the third device to the interface on the first device.

20. The method of non-transitory computer-readable storage medium 13, wherein generating the list of potential links between an interface on one of the devices and an interface on another one of the devices comprises:

generating a flow identifier indicating data traffic between the interface on the one of the devices and the interface on the another one of the devices; and adding a potential link to the list of potential links based on the flow identifier.

* * * * *